(12) United States Patent
Noro et al.

(10) Patent No.: US 7,960,459 B2
(45) Date of Patent: *Jun. 14, 2011

(54) CURABLE COMPOSITION

(75) Inventors: Noriko Noro, Takasago (JP); Toshihiko Okamoto, Osaka (JP); Ayako Yano, Takasago (JP); Yoshikazu Morii, Takasago (JP)

(73) Assignee: Kaneka Corporation, Osaka (JP)

( * ) Notice: Subject to any disclaimer, the term of this patent is extended or adjusted under 35 U.S.C. 154(b) by 176 days.

This patent is subject to a terminal disclaimer.

(21) Appl. No.: 12/279,466

(22) PCT Filed: Feb. 9, 2007

(86) PCT No.: PCT/JP2007/052422
§ 371 (c)(1),
(2), (4) Date: Jan. 7, 2009

(87) PCT Pub. No.: WO2007/094276
PCT Pub. Date: Aug. 23, 2007

(65) Prior Publication Data
US 2009/0186993 A1 Jul. 23, 2009

(30) Foreign Application Priority Data

Feb. 16, 2006 (JP) ................................ 2006-039241
Feb. 16, 2006 (JP) ................................ 2006-039243
Feb. 21, 2006 (JP) ................................ 2006-044565
Feb. 21, 2006 (JP) ................................ 2006-044566
May 10, 2006 (JP) ................................ 2006-132021

(51) Int. Cl.
*C07C 277/08* (2006.01)
*C07C 279/18* (2006.01)
*C08C 19/30* (2006.01)

(52) U.S. Cl. ...................... 524/195; 524/437; 525/326.5; 525/330.3; 525/330.5; 525/374; 525/379; 525/381; 525/403; 525/409; 525/418; 525/474; 526/319; 526/335; 526/348; 526/348.7; 528/10; 528/25; 528/26; 528/28; 528/32; 528/41; 528/44; 528/422; 528/492; 564/230; 564/237; 564/238; 564/244; 564/248

(58) Field of Classification Search .................. 524/195, 524/437; 525/326.5, 330.3, 330.5, 374, 379, 525/381, 403, 409, 418, 474; 526/319, 335, 526/348, 348.7; 528/10, 25, 26, 28, 32, 41, 528/44, 422, 492; 564/230, 237, 238, 244, 564/248
See application file for complete search history.

(56) References Cited

U.S. PATENT DOCUMENTS

| 4,302,571 | A | 11/1981 | Arai et al. |
| 4,323,488 | A | 4/1982 | Takago et al. |
| 4,904,732 | A | 2/1990 | Iwahara et al. |
| 4,956,227 | A | 9/1990 | Hirayama et al. |
| 6,410,640 | B1 | 6/2002 | Fukunaga et al. |
| 7,115,695 | B2 | 10/2006 | Okamoto et al. |
| 2002/0037970 | A1 | 3/2002 | Moriyama et al. |
| 2005/0014894 | A1* | 1/2005 | Flannigan et al. ............ 524/864 |
| 2006/0252903 | A1* | 11/2006 | Wakabayashi et al. ......... 528/34 |
| 2007/0203297 | A1 | 8/2007 | Wakabayashi et al. |
| 2007/0299214 | A1 | 12/2007 | Wakabayashi et al. |
| 2008/0021140 | A1 | 1/2008 | Wakabayashi et al. |
| 2009/0182091 | A1 | 7/2009 | Noro et al. |
| 2009/0182099 | A1 | 7/2009 | Noro et al. |
| 2010/0004367 | A1 | 1/2010 | Yano et al. |

FOREIGN PATENT DOCUMENTS

| EP | 0 333 222 A1 | 9/1989 |
| EP | 0 538 881 A2 | 4/1993 |
| EP | 1285946 A | 2/2003 |
| EP | 1391484 A | 2/2004 |
| JP | 52-73998 A | 6/1977 |
| JP | 62-236878 A | 10/1987 |
| JP | 63-6041 A | 1/1988 |
| JP | 02-036260 | 2/1990 |
| JP | 5-32877 A | 2/1993 |
| JP | 5-39428 A | 2/1993 |
| JP | 5-117519 A | 5/1993 |
| JP | 5-295248 A | 11/1993 |
| JP | 8-41359 A | 2/1996 |
| JP | 9-12709 A | 1/1997 |
| JP | 9-12860 A | 1/1997 |
| JP | 11-269336 A | 10/1999 |
| JP | 2000-038503 A | 2/2000 |
| JP | 2000-313814 A | 12/2000 |

(Continued)

OTHER PUBLICATIONS

European Search Report dated Jul. 1, 2009.
English Translation of ISR for PCT/JP2007/052418 dated, Apr. 10, 2007.
English Translation of ISR for PCT/JP2007/052419 dated, , Apr. 17, 2007.

(Continued)

*Primary Examiner* — Vasu Jagannathan
*Assistant Examiner* — Richard A Huhn
(74) *Attorney, Agent, or Firm* — Sughrue Mion, PLLC

(57) ABSTRACT

The present invention has its object to provide a curable composition which comprises a reactive silyl group-containing organic polymer, does not contain, as a silanol condensation catalyst, any organotin type curing catalyst currently of concern because of the toxic feature thereof, is excellent in surface curability and depth curability and, further, can provide cured products excellent in adhesiveness; the above object can be achieved by a curable composition which comprises: an organic polymer (A) containing a silicon-containing group capable of crosslinking under siloxane bond formation; and a guanidine compound (B-1), as a silanol condensation catalyst (B), represented by the general formula (1):

$$R^1N=C(NR^1{}_2)_2 \qquad (1)$$

(wherein one of the five $R^1$s is an aryl group and the other four $R^1$s each independently is a hydrogen atom or a hydrocarbon group in which the carbon atom at position 1 is saturated).

10 Claims, No Drawings

FOREIGN PATENT DOCUMENTS

| | | | |
|---|---|---|---|
| JP | 2000-345054 | A | 12/2000 |
| JP | 2003-206410 | A | 7/2003 |
| JP | 2004-083805 | A | 3/2004 |
| JP | 2005-248175 | A | 9/2005 |
| JP | 2005248175 | A * | 9/2005 |
| JP | 2006-188632 | A | 7/2006 |
| WO | 2004/099318 | A1 | 11/2004 |
| WO | WO 2004099318 | A1 * | 11/2004 |
| WO | 2005/097898 | A1 | 10/2005 |
| WO | 2005/097907 | A1 | 10/2005 |
| WO | 2006/051798 | A1 | 5/2006 |

OTHER PUBLICATIONS

Extended European Search Report for EP 07714031.7 dated, Jun. 24, 2009.

English Translation of International Preliminary Report on Patentability (Chapter I) of PCT/JP2007/052418.

English Translation of International Preliminary Report on Patentability (Chapter I) of PCT/JP2007/052419.

XP 002531655, abstracting JP 2005-248175.

Extended European Search Report for EP 07714030.9 dated, Jul. 26, 2009.

\* cited by examiner ns. Further, Patent
CURABLE COMPOSITION

TECHNICAL FIELD

The present invention relates to a curable composition which comprises an organic polymer containing a silicon atom-bound hydroxyl or hydrolyzable group and containing a silyl group capable of crosslinking under siloxane bond formation (hereinafter referred to as a "reactive silyl group").

BACKGROUND ART

It is known that organic polymers containing at least one reactive silyl group in the molecule have properties such that they are crosslinked under siloxane bond formation resulting from hydrolysis and other reactions of the reactive silyl group due to moisture and the like, even at room temperature to give rubber-like cured products.

Among these reactive silyl group-containing polymers, those polymers which have a polyoxyalkylene type or polyisobutylene type main chain skeleton are disclosed in Patent Document 1, Patent Document 2 and the like and have already been produced industrially and are in wide use in such fields as sealants, adhesives and coatings.

For obtaining cured products from a curable composition comprising such reactive silyl group-containing organic polymers, a silanol condensation catalyst is used. Generally used as the silanol condensation catalyst are organotin type catalysts having a carbon-tin bond such as dibutyltin bis (acetylacetonate) and dibutyltin dilaurate. In recent years, however, the toxicity of organotin type compounds have been pointed out and development of non-organotin catalysts has been looked for.

Patent Document 3, Patent Document 4, Patent Document 5, Patent Document 6 and Patent Document 7 disclose carboxylic acid tin salts and other carboxylic acid metal salts as silanol condensation catalysts and further disclose that the addition of an amine compound as a promoter to these catalysts results in improved curability.

Further, from the viewpoint of reduction in environmental stress, substantially metal-free catalysts are desired and, Patent Document 8 discloses the combined use system of an amine compound and a carboxylic acid for giving a metal-free silanol condensation catalyst.

However, when the non-organotin type catalysts described in the patents mentioned above are used, the adhesiveness of the cured products obtained tends to be inferior as compared with the use of organotin type catalysts.

While it is known in the art that the use of an amine compound in combination with another silanol condensation catalyst results in improved curability, as mentioned above, there is disclosed almost no examples in which amine compounds are used singly as silanol condensation catalysts.

In addition to amine compounds other than the above-exemplified compounds described in the patents mentioned above, Patent Document 9, Patent Document 10 and Patent Document 11 disclose, as silanol condensation catalysts, guanidine and diphenylguanidine which are included in guanidine compounds.

However, guanidines are chemically unstable compounds, hence they are not suited for use as silanol condensation catalysts. When guanidine compounds containing a plurality of aryl groups as substituents, for example diphenylguanidine, are used as silanol condensation catalysts, their catalytic activity tends to be low, as pointed out in Patent Document 12 as well.

On the other hand, Patent Document 12 discloses a technology which comprises using aryl group-substituted biguanide compounds, which constitute a group among amine compounds, as silanol condensation catalysts. Further, Patent Document 13 mentions tetramethylguanidine as an exemplary silanol condensation catalyst for siloxane-modified polyoxyalkylenes having a specific terminal structure, together with catalysts known in the art.

However, when the aryl group-substituted biguanide compounds described in Patent Document 12 are used as silanol condensation catalysts, the curable compositions obtained sometimes fail to show a practical level of surface curability; further, the compositions tend to be poor in depth curability in the early stage of curing.

The characteristic "depth curability" becomes important when the curable composition is to be used as an adhesive composition for industrial use, for instance. The problem is that when a curable composition poor in depth curability is used as an adhesive and bonded articles are transported while the adhesive inside is not yet in a sufficiently cured condition, the adherends may be finally bonded together in a condition shifted in relation to each other or bonding failure may be caused; hence, it becomes necessary to spend a long period of time for setting of the adherends.

Thus, this leads to decreases in working efficiency and the necessity of space for holding adherends and is a problem to be avoided from the practical viewpoint.

Further, when those guanidine compounds having no aryl group substituents which are described in Patent Document 13, for example tetramethylguanidine, are used as silanol condensation catalysts, the resulting curable compositions sometimes fail to show practical levels of surface curability and, further, fail to provide sufficient levels of adhesiveness in some cases.

Thus, in the existing circumstances, no curable composition balanced with one another among all curing behavior characteristics (surface curability, depth curability, adhesiveness, etc.) and capable of being submitted to practical use is found among the non-organotin type curable compositions which comprise a reactive silyl group-containing organic polymer and in which an amine compound-based silanol condensation catalyst is used.

Patent Document 1: Japanese Kokai Publication S52-73998
Patent Document 2: Japanese Kokai Publication S63-6041
Patent Document 3: Japanese Kokai Publication H05-39428
Patent Document 4: Japanese Kokai Publication H09-12860
Patent Document 5: Japanese Kokai Publication 2000-313814
Patent Document 6: Japanese Kokai Publication 2000-345054
Patent Document 7: Japanese Kokai Publication 2003-206410
Patent Document 8: Japanese Kokai Publication H05-117519
Patent Document 9: Japanese Kokai Publication H05-295248
Patent Document 10: Japanese Kokai Publication H05-32877
Patent Document 11: Japanese Kokai Publication H08-41359
Patent Document 12: Japanese Kokai Publication 2005-248175
Patent Document 13: Japanese Kokai Publication H09-12709

SUMMARY OF THE INVENTION

It is an object of the present invention to provide a curable composition which comprises a reactive silyl group-containing organic polymer, does not contain, as a silanol condensation catalyst, any organotin type curing catalyst currently of concern because of the toxic feature thereof, is excellent in surface curability and depth curability and, further, can provide cured products excellent in adhesiveness.

The present inventors paid attention to those amine compound-based silanol condensation catalysts so far proposed and investigated in various documents but not yet in practical use, in particular to the structure of guanidine compounds, and made intensive investigations to accomplish the above-mentioned object. As a result, the inventors found that guanidine compounds having a specific structure represented by the general formulas (1) to (3) shown below can act specifically as silanol condensation catalysts and can substitute for organotin type curing catalysts. Based on this finding, the present invention has been completed.

That is, the present invention relates to the following (I) to (XII):

(I). a curable composition which comprises:
an organic polymer (A) containing a silicon-containing group capable of crosslinking under siloxane bond formation; and
a guanidine compound (B-1), as a silanol condensation catalyst (B), represented by the general formula (1):

$$R^1N=C(NR^1{}_2)_2 \quad (1)$$

(wherein one of the five $R^1$s is an aryl group and the other four $R^1$s each independently is a hydrogen atom or a hydrocarbon group in which the carbon atom at position 1 is saturated), (II). the curable composition according to (I), wherein the guanidine compound (B-1) is a guanidine compound represented by the general formula (2):

[Chem. 3]

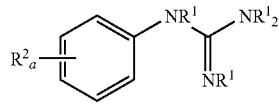

(2)

(wherein the four $R^1$s each independently is a hydrogen atom or a hydrocarbon group in which the carbon atom at position 1 is saturated; the a $R^2$s each independently is a hydrogen atom, a halogen atom, a hydroxyl group, an amino group, a nitro group, a cyano group, a sulfonic acid group, or an organic group; and a is an integer of 0 to 5), (III). the curable composition according to (I) or (II), wherein the guanidine compound (B-1) is a guanidine compound represented by the general formula (3):

[Chem. 4]

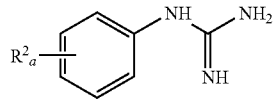

(3)

(wherein the a $R^2$s each independently is a hydrogen atom, a halogen atom, a hydroxyl group, an amino group, a nitro group, a cyano group, a sulfonic acid group, or an organic group; and a is an integer of 0 to 5), (IV). the curable composition according to any of (I) to (III), wherein the guanidine compound (B-1) is 1-phenylguanidine and/or 1-(o-tolyl)guanidine, (V). the curable composition according to any of (I) to (IV), wherein the main chain skeleton of the organic polymer (A) comprises at least one selected from among a hydrogen atom, a carbon atom, a nitrogen atom, an oxygen atom and a sulfur atom, (VI). the curable composition according to any of (I) to (V), wherein the main chain skeleton of the organic polymer (A) comprises at least one selected from the group consisting of polyoxyalkylene polymers, saturated hydrocarbon polymers and (meth)acrylate ester polymers, (VII). the curable composition according to (VI), wherein the polyoxyalkylene polymer is a polyoxypropylene polymer, (VIII). the curable composition according to any of (I) to (VII), which contains the guanidine compound (B-1) in an amount of 0.001 to 20 parts by weight per 100 parts by weight of the organic polymer (A), (IX). the curable composition according to any of (I) to (IX), which contains an organic acid as the component (C) in an amount of 0.001 to 20 parts by weight per 100 parts by weight of the organic polymer (A), (X). the curable composition according to any of (I) to (IX), which contains a titanium compound and/or an aluminum compound as the component (D) in an amount of 0.001 to 20 parts by weight per 100 parts by weight of the organic polymer (A), (XI). a sealant which comprises the curable composition according to any of (I) to (X), and (XII). an adhesive which comprises the curable composition according to any of (I) to (X).

The curable composition of the invention does not contain any organotin type compound that is of concern in recent years from the toxicity viewpoint, and therefore is superior in environmental compatibility. By using a guanidine compound having a herein-defined structure as a silanol condensation catalyst for reactive silyl group-containing organic polymers, it becomes possible to provide a curable composition excellent in surface curability, depth curability, and adhesiveness as well.

DETAILED DESCRIPTION OF THE INVENTION

In the following, the present invention is described in detail.

The curable composition of the invention comprises, as an essential constituent (A), a reactive silyl group-containing organic polymer (hereinafter referred to also as "component (A)", "reactive silyl group-containing organic polymer (A)" or "organic polymer (A)").

The organic polymer (A) has, on an average, at least one reactive silyl group per molecule. The reactive silyl group, so referred to herein, is an organic group containing hydroxyl groups or hydrolyzable groups each bound to a silicon atom. The reactive silyl group-containing organic polymer (A) is crosslinked under siloxane bond formation as a result of a reaction promoted by a silanol condensation catalyst.

As the reactive silyl group, there may be mentioned groups represented by the general formula (4):

$$-SiR^3{}_{3-b}X_b \quad (4)$$

(the (3-b) $R^3$s each independently is an alkyl group containing 1 to 20 carbon atoms, an aryl group containing 6 to 20 carbon atoms, an aralkyl group containing 7 to 20 carbon atoms or a triorganosiloxy group represented by $-OSi(R')_3$ (in which each R' is independently a hydrocarbon group containing 1 to 20 carbon atoms. The b X groups each is independently a hydroxyl group or a hydrolyzable group. Further, b is an integer 1 to 3).

The curable composition of the present invention, which comprises a reactive silyl group-containing organic polymer (A) as the main component, is better in compatibility with the silanol condensation catalyst, namely the guanidine compound (B-1), as compared with a composition which comprises, as the main component, such an inorganic polymer as polydimethylsiloxane, hence is preferred. The curable composition comprising an organic polymer (A) is excellent in curability and the cured products obtained therefrom are characterized by excellent adhesiveness.

Further, for the same reasons, the organic polymer (A) preferably has a main chain skeleton containing at least one atom selected from among a hydrogen atom, a carbon atom, a nitrogen atom, an oxygen atom and a sulfur atom.

The main chain skeleton of the organic polymer (A) is not particularly restricted but includes, polyoxyalkylene type polymers such as polyoxyethylene, polyoxypropylene, polyoxybutylene, polyoxytetramethylene, polyoxyethylene-polyoxypropylene copolymers and polyoxypropylene-polyoxybutylene copolymers; ethylene-propylene type copolymers; polyisobutylene, copolymers of isobutylene and isoprene or the like, polychloroprene, polyisoprene, copolymers of isoprene or butadiene and acrylonitrile and/or styrene or the like; polybutadiene and copolymers of isoprene or butadiene and acrylonitrile and styrene or the like; hydrocarbon type polymers such as hydrogenated polyolefin polymers derived from these polyolefin type polymers by hydrogenation; polyester type polymers obtained by condensation of a dibasic acid such as adipic acid and a glycol, or ring-opening polymerization of a lactone (s); (meth)acrylate ester polymers obtained by radical polymerization of such a compound as ethyl (meth)acrylate and butyl (meth)acrylate; vinyl polymers obtained by radical polymerization of such a compound as a (meth)acrylate ester compound, vinyl acetate, acrylonitrile and styrene; graft polymers obtained by polymerizing a vinyl compound in such polymers as mentioned above; polysulfide type polymers; polyamide type polymers such as polyamide 6 produced by ring-opening polymerization of ε-caprolactam, polyamide 6-6 produced by polycondensation of hexamethylenediamine and adipic acid, polyamide 6-10 produced by polycondensation of hexamethylenediamine and sebacic acid, polyamide 11 produced by polycondensation of e-aminoundecanoic acid, polyamide 12 produced by ring-opening polymerization of ε-aminolaurolactam, and copolymer polyamides composed of a plurality of the polyamides mentioned above; polycarbonate type polymers such as polycarbonates produced by polycondensation of bisphenol A and carbonyl chloride; diallyl phthalate type polymers; and like organic polymers.

Preferred among those mentioned above are organic polymers (A) having, as the main chain skeleton, saturated hydrocarbon type polymers such as polyisobutylene, hydrogenated polyisoprene and hydrogenated polybutadiene, polyoxyalkylene type polymers, (meth)acrylate ester polymers and polysiloxane type polymers, in view of their relatively low glass transition temperature and of good low-temperature resistance of cured products obtained therefrom.

The glass transition temperature of the reactive silyl group-containing organic polymer (A) is not particularly restricted but preferably is not higher than 20° C., more preferably not higher than 0° C., most preferably not higher than −20° C. When the glass transition temperature is higher than 20° C., the viscosity of the curable composition increases in the winter season or in cold districts, developing a tendency toward lowered workability and, further, the flexibility of cured products obtained decreases and the elongation thereof tends to decrease.

The glass transition temperature mentioned above can be determined by DSC measurement according to the method prescribed in JIS K 7121.

A curable composition comprising, as the main component, a saturated hydrocarbon type polymer and an organic polymer whose main chain skeleton is a polyoxyalkylene type polymer and a (meth)acrylate ester polymer is more preferred since, when it is used as an adhesive or sealant, low-molecular-weight components scarcely migrate to (i.e. stain) adherends.

Further, an organic polymer whose main chain skeleton is a polyoxyalkylene type polymer and a (meth)acrylate ester polymer is particularly preferred since it is high in moisture permeability and, when used as a main component of a one-pack type adhesive or sealant, it is excellent in depth curability and gives cured products excellent in adhesiveness. Most preferred is an organic polymer whose main chain skeleton is a polyoxyalkylene type polymer.

The polyoxyalkylene type polymer to be used as the main chain skeleton of the organic polymer (A) is a polymer having a repeating unit represented by the general formula (5):

($R^4$ is a straight or branched alkylene group containing 1 to 14 carbon atoms).

The group $R^4$ in the general formula (5) is not particularly restricted but may be any of the straight or branched alkylene groups containing 1 to 14 carbon atoms and, among those, straight or branched alkylene groups containing 2 to 4 carbon atoms are preferred.

The repeating unit defined by the general formula (5) is not particularly restricted but includes, for example, —$CH_2O$—, —$CH_2CH_2O$—, —$CH_2CH(CH_3)$ O—, —$CH_2CH(C_2H_5)$ O—, —$CH_2C(CH_3)_2O$— and —$CH_2CH_2CH_2CH_2O$—.

The polyoxyalkylene type polymer may have one repeating unit species or a plurality of repeating unit species. In the case of use in the field of sealants and the like, in particular, an organic polymer (A) in which the main component of the main chain skeleton is a propylene oxide polymer is preferred since such polymer is noncrystalline and relatively low in viscosity.

A method of producing such a polyoxyalkylene type polymer is not particularly restricted but may be any of the methods known in the art. For example, mention may be made of the method using an alkali catalyst such as KOH, the method disclosed in Japanese Kokai Publication S61-215623 which uses, as a catalyst, a transition metal-porphyrin complex, such as a complex obtained by reacting an organoaluminum compound with porphyrin, the methods disclosed in Japanese Kokoku Publications S46-27250 and S59-15336 and U.S. Pat. Nos. 3,278,457, 3,278,458, 3,278,459, 3,427,256, 3,427,334 and 3,427,335, among others, which use, as a catalyst, a composite metal cyanide complex, the method disclosed in Japanese Kokai Publication H10-273512 which uses, as a catalyst, a polyphosphazene salt, and the method disclosed in Japanese Kokai Publication H11-060722 which uses, as a catalyst, a phosphazene compound.

The method of producing a reactive silyl group-containing polyoxyalkylene type polymer is not particularly restricted but may be any of the methods known in the art. For example, mention may be made of the methods disclosed in Japanese Kokoku Publications S45-36319 and S46-12154, Japanese Kokai Publications S50-156599, S54-6096, S55-13767, S55-13468 and S57-164123, Japanese Kokoku Publication H03-2450 and U.S. Pat. Nos. 3,632,557, 4,345,053, 4,366,307 and 4,960,844, among others, and the methods disclosed in Japanese Kokai Publications S61-197631, S61-215622, S61-

215623, S61-218632, H03-72527, H03-47825 and H08-231707, among others, according to which polymers high in molecular weight (number average molecular weight of 6,000 or higher) and narrow in molecular weight distribution (Mw/Mn of 1.6 or below) can be obtained.

In formulating the curable composition using the reactive silyl group-containing polyoxyalkylene type polymer mentioned above, the polymer may comprise a single species or a combination of a plurality of species thereof.

The saturated hydrocarbon type polymer to be used as the main chain skeleton of the organic polymer (A) is a polymer whose molecules are substantially free of any carbon-carbon unsaturated bond, except for an aromatic ring, and is excellent in heat resistance, weather resistance, durability and a moisture barrier property.

The saturated hydrocarbon type polymer is not particularly restricted but there may be mentioned (i) polymers derived from an olefin compound containing 2 to 6 carbon atoms, such as ethylene, propylene, 1-butene and isobutylene as the repeating unit species, (ii) polymers derived from a diene type compound, such as butadiene and isoprene as the repeating unit species, and (iii) polymers obtained by copolymerizing the above-mentioned diene type compound and the above-mentioned olefin type compound, followed by hydrogenation. Among these, isobutylene type polymers and hydrogenated polybutadiene type polymers are preferred in view of ease of functional-group introduction into an end thereof, ease of molecular weight control and adjustability of the number of terminal functional groups, among others; isobutylene type polymers are more preferred.

The isobutylene type polymer may be such one that all of the repeating units are derived from isobutylene or a copolymer with another compound. When the isobutylene type copolymer is used as the main chain skeleton, the polymer preferably has an isobutylene-derived repeating unit content, in each molecule, of not lower than 50% by weight, more preferably not lower than 80% by weight, particularly preferably 90 to 99% by weight, so that the cured products obtained may have excellent rubber characteristics.

A method of producing the saturated hydrocarbon type polymer is not particularly restricted but may be any of various conventional polymerization methods. Among them, the living polymerization method the development of which has been remarkable in recent years is preferred and, for example, the Inifer polymerization found by Kennedy et al. (J. P. Kennedy et al., J. Polymer Sci., Polymer Chem. Ed., 1997, 15, p. 2843) may be mentioned as a method of producing isobutylene-based polymers using the living polymerization method. This polymerization method enables introduction of various functional groups into molecular ends and the isobutylene type polymers obtained are known to have a molecular weight of about 500 to 100,000 with a molecular weight distribution of not broader than 1.5.

A method of producing the reactive silyl group-containing saturated hydrocarbon polymer is not particularly restricted but may be any of the methods known in the art, for example the methods disclosed in Japanese Kokoku Publications H04-69659 and H07-108928, Japanese Kokai Publications S63-254149, S64-22904 and H01-197509 and Japanese Patents Nos. 2539445 and 2873395 and Japanese Kokai Publication H07-53882.

In formulating the curable composition using the above-mentioned reactive silyl group-containing saturated hydrocarbon type polymer, the polymer may comprise a single species or a combination of a plurality of species thereof.

A (meth)acrylate ester polymer to be used as the main chain skeleton of the organic polymer (A) is a polymer in which the repeating unit is derived from a (meth)acrylate ester compound. The expression "(meth)acrylate ester" refers to an acrylate ester and/or a methacrylate ester and has the same meaning also in the description which follows.

The (meth)acrylate ester compound to be used as the repeating unit is not particularly restricted but includes such (meth)acrylate compounds as (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, toluoyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, γ-(methacryloyloxypropyl)trimethoxysilane, γ-(methacryloyloxypropyl) dimethoxymethylsilane, (meth)acrylic acid-ethylene oxide adducts, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, perfluoroethyl (meth)acrylate, trifluoromethyl (meth)acrylate, bis(trifluoromethylmethyl) (meth)acrylate, 2-trifluoromethyl-2-perfluoroethylethyl (meth)acrylate, 2-perfluorohexylethyl (meth)acrylate, 2-perfluorodecylethyl (meth) acrylate and 2-perfluorohexadecylethyl (meth)acrylate.

The (meth)acrylate ester polymer includes copolymers of a (meth)acrylate ester compound and a vinyl compound copolymerizable therewith.

The vinyl compound is not particularly restricted but includes: styrene compounds such as styrene, vinyltoluene, α-methylstyrene, chlorostyrene, and styrenesulfonic acid and salts thereof; silyl group-containing vinyl compounds such as vinyltrimethoxysilane and vinyltriethoxysilane; maleic acid, maleic anhydride, and maleic acid monoalkyl esters and dialkyl esters; fumaric acid and fumaric acid monoalkyl esters and dialkyl esters; maleimide type-compounds such as maleimide, methylmaleimide, ethylmaleimide, propylmaleimide, butylmaleimide, hexylmaleimide, octylmaleimide, dodecylmaleimide, stearylmaleimide, phenylmaleimide and cyclohexylmaleimide; nitrile group-containing vinyl compounds such as acrylonitrile and methacrylonitrile; amide group-containing vinyl compounds such as acrylamide and methacrylamide; vinyl esters such as vinyl acetate, vinyl propionate, vinyl pivalate, vinyl benzoate and vinyl cinnamate; alkenes such as ethylene and propylene; conjugated dienes such as butadiene and isoprene; vinyl chloride, vinylidene chloride, allyl chloride and allyl alcohol. It is also possible to use a plurality of these as copolymerization components.

Among the (meth)acrylate ester polymers obtained from the compounds mentioned above, those organic polymers which comprise, as the main chain skeleton, a copolymer of a styrene compound and a (meth)acrylate compound are preferred since they give cured products excellent in physical properties; those organic polymers which comprise, as the main chain skeleton, a copolymer of an acrylate ester compound and a methacrylate ester compound are more preferred, and those organic polymers which comprise, as the main chain skeleton, a polymer of an acrylate ester compound are particularly preferred.

For use in general architectural fields, the curable composition is required to be low in viscosity, while the cured products obtained therefrom are required to be low in modulus and high in elongation, weather resistance and thermal stability.

More preferred as ones meeting these requirements are organic polymers (A) whose main chain skeleton is derived from a butyl acrylate compound.

On the other hand, for use in automotive or like fields, the cured products obtained are required to be excellent in oil resistance.

More preferred as one giving cured products excellent in oil resistance is an organic polymer (A) whose main chain skeleton is a copolymer mainly derived from ethyl acrylate.

Curable compositions comprising the organic polymer (A) whose main chain skeleton is an ethyl acrylate-based copolymer tend to give cured products somewhat inferior in low-temperature characteristics (low-temperature resistance) in spite of their being excellent in oil resistance. For improving the low-temperature characteristics, replacement is made of a part of ethyl acrylate with butyl acrylate. Since, however, an increased proportion of butyl acrylate tends to impair the good oil resistance, the proportion thereof is preferably not higher than 40%, more preferably not higher than 30%, in cases of a field where oil resistance is required.

The use, as a comonomer component, of 2-methoxyethyl acrylate or 2-ethoxyethyl acrylate which has an oxygen atom introduced into the side chain alkyl group is also preferred for improving low-temperature characteristics and the like without causing decrease in oil resistance.

Since, however, the introduction of an alkoxy group having an ether bond in the side chain tends to render the cured products obtained inferior in thermal stability, the proportion thereof is preferably not higher than 40% in cases of use where thermal stability is required.

As mentioned above, it is possible to obtain an organic polymer (A) whose main chain skeleton is an ethyl acrylate-based copolymer and which is suited for various uses or can meet requirements by selecting the comonomer component species and varying the proportion thereof taking into consideration such physical properties as oil resistance, thermal stability and low temperature characteristics as required of the cured products obtained. For example, there may be mentioned, without any limitative meaning, copolymers of ethyl acrylate, butyl acrylate and 2-methoxyethyl acrylate copolymer (weight ratio: 40-50/20-30/30-20) as examples excellent in balance among such physical properties as oil resistance, thermal stability and low-temperature characteristics.

In the practice of the present invention, these preferred compounds may be copolymerized and, further, block-copolymerized with another compound and, on such occasion, the content of these preferred compounds is preferably not lower than 40% by weight.

A method of producing the (meth)acrylate ester polymer is not particularly restricted but may be any of the methods known in the art. Among them, the living radical polymerization method is preferably used in particular in view of the ease of high-rate introduction of a crosslinking functional group into a molecular chain end and the possibility of obtaining polymers narrow in molecular weight distribution and low in viscosity.

The polymers obtained by ordinary free radical polymerization using, for example, an azo compound or peroxide as a polymerization initiator tend to show an increased molecular weight distribution value generally not lower than 2 and an increased level of viscosity.

Among the methods of producing (meth)acrylate ester polymers using the above-mentioned "living radical polymerization method", the "atom transfer radical polymerization method" which uses an organic halide or sulfonyl halide compound as an initiator and a transition metal complex as a catalyst is preferred as the method of producing (meth)acrylate ester polymers containing a specific functional group since it has not only such characteristics of the "living radical polymerization" as the narrowness in molecular weight distribution and the capability to give polymers low in viscosity but also a high degree of freedom in selecting the initiator and catalyst and the capability to provide the polymers with a halogen or the like at ends thereof relatively advantageous to functional-group exchange reactions. As for the atom transfer radical polymerization method, there may be mentioned, for example, the method described in Matyjaszewski et al., Journal of the American Chemical Society (J. Am. Chem. Soc.), 1995, 117, p. 5614.

A method of producing the reactive silyl group-containing (meth)acrylate ester polymer is not particularly restricted but includes, for example, the free radical polymerization method using a chain transfer agent, as disclosed in Japanese Kokoku Publications H03-14068 and H04-55444 and Japanese Kokai Publication H06-211922, the atom transfer radical polymerization method disclosed in Japanese Kokai Publication H09-272714, and the like.

It is also possible to use a (meth)acrylate ester copolymer derived from a plurality of the (meth)acrylate ester compounds mentioned above as the main chain skeleton of the organic polymer (A).

As typical examples of the (meth)acrylate ester copolymer derived from a plurality of (meth)acrylate ester compounds, there may be mentioned copolymers whose main chain skeleton substantially comprises: a repeating unit having an alkyl group containing 1 to 8 carbon atoms as represented by the general formula (6):

$$—CH_2—C(R^5)(COOR^6)— \quad (6)$$

($R^5$ is a hydrogen atom or a methyl group and $R^6$ is an alkyl group containing 1 to 8 carbon atoms); and a repeating unit having an alkyl group containing 9 or more carbon atoms as represented by the general formula (7):

$$—CH_2—C(R^5)(COOR^7)— \quad (7)$$

($R^5$ is as defined above referring to the general formula (6) and $R^7$ is an alkyl group containing 9 or more carbon atoms).

The group $R^6$ in the general formula (6) is not particularly restricted but may be any of the alkyl groups containing 1 to 8 carbon atoms, for example a methyl group, an ethyl group, a propyl group, an n-butyl group, a t-butyl group and a 2-ethylhexyl group; among these, alkyl groups containing 1 to 4 carbon atoms are preferred. The group $R^6$ contained in the copolymers is not always restricted to a single alkyl group species.

The group $R^7$ in the general formula (7) is not particularly restricted but may be any of the alkyl groups containing 9 or more carbon atoms, for example a lauryl group, a dodecyl group, a cetyl group, a stearyl group and a behenyl group. Among these, alkyl groups containing 10 to 30 carbon atoms are preferred and long-chain alkyl groups containing 10 to 20 carbon atoms are more preferred. The group $R^7$ contained in the copolymers is not always restricted to a single alkyl group species.

The (meth)acrylate ester copolymer substantially comprises the repeating units defined by the general formula (6) and general formula (7). The term "substantially" as used herein means that the total content of the repeating units defined by the general formulas (6) and (7) in the copolymer is not lower than 50% by weight, and the total content of the repeating units defined by the general formulas (6) and (7) in the copolymer is preferably not lower than 70%.

The content ratio between the repeating units of general formulas (6) and (7) occurring in the copolymer as expressed in terms of the weight ratio (general formula (6):general formula (7)) is preferably 95:5 to 40:60, more preferably 90:10 to 60:40.

The (meth)acrylate ester copolymer comprises a copolymer of (meth)acrylate ester compounds used as the repeating units defined by the general formulas (6) and (7) and a vinyl compound copolymerizable therewith.

As the vinyl compound, there may be mentioned, for example, acrylic acids such as acrylic acid and methacrylic acid; amide group-containing compounds such as acrylamide, methacrylamide, N-methylolacrylamide and N-methylolmethacrylamide, epoxy group-containing compounds such as glycidyl acrylate and glycidyl methacrylate, amino group-containing compounds such as diethylaminoethyl acrylate, diethylaminoethyl methacrylate and aminoethyl vinyl ether; and, further, such compounds as acrylonitrile, styrene, α-methylstyrene, alkyl vinyl ethers, vinyl chloride, vinyl acetate, vinyl propionate and ethylene.

These reactive silyl group-containing organic polymers may be used singly or in combination of two or more species. More specifically, it is also possible to use an organic-polymer blend comprising two or more species selected from the group consisting of reactive silyl group-containing polyoxyalkylene type polymers, reactive silyl group-containing saturated hydrocarbon type polymers and reactive silyl group-containing (meth)acrylate ester polymers.

A method of producing the organic polymer blend comprising a reactive silyl group-containing polyoxyalkylene type polymer and a reactive silyl group-containing (meth)acryl ester polymer is not particularly restricted but there may be mentioned, for example, the methods disclosed in Japanese Kokai Publications S59-122541, S63-112642, H06-172631 and H11-116763, and the like. The organic-polymer blend comprising a reactive silyl group-containing saturated hydrocarbon type polymer and a reactive silyl group-containing (meth)acrylate ester polymer is not particularly restricted but mention may be made of the polymers disclosed in Japanese Kokai Publications H01-168764 and 2000-186176, and the like.

Further, in addition to those mentioned above, the organic-polymer blends comprising a reactive silyl functional group-containing (meth)acrylate ester polymer can also be produced by a method comprising polymerizing a (meth)acrylate ester monomer in the presence of a reactive silyl group-containing polymer. This production method is not particularly restricted but there may be mentioned, for example, the methods disclosed in Japanese Kokai Publications S59-78223, S59-168014, S60-228516 and S60-228517. In the main chain skeleton of the organic polymer (A), there may further be present, if necessary, another repeating unit containing, for example, a urethane bond, so long as the effects of the present invention are not significantly lessened thereby.

The urethane bond-containing repeating unit is not particularly restricted but there may be mentioned, for example, a repeating unit comprising a group formed by the reaction between an isocyanato group and an active hydrogen group (the group thus formed is hereinafter referred to also as an "amide segment").

The amide segment is an organic group represented by the general formula (8):

—NR$^8$—C(=O)— (8)

(R$^8$ is a hydrogen atom or an organic group).

The amide segment is not particularly restricted but includes, for example, a urethane group formed by the reaction between an isocyanato group and a hydroxyl group; a urea group formed by the reaction between an isocyanato group and an amino group; and a thiourethane group formed by the reaction between an isocyanato group and a mercapto group.

Those organic groups formed by the reaction of an active hydrogen in the urethane group, the urea group and the thiourethane group with an isocyanato group also fall within the definition of "amide segment" as given herein.

A method of producing the reactive silyl group-containing organic polymer containing an amide segment in the main chain skeleton thereof is not particularly restricted but there may be mentioned, for example, the method comprising reacting an active hydrogen-terminated organic group-containing organic polymer with an excess of a polyisocyanate compound to give a polymer having an isocyanato group at a polyurethane type main chain end and, thereafter or simultaneously therewith, reacting all or part of the isocyanato groups in the polymer with a group W in a silicon compound represented by the general formula (9):

W—R$^9$—SiR$^3{}_{3-b}$X$_b$ (9)

(R$^9$ is a divalent organic group, more preferably a divalent hydrocarbon group containing 1 to 20 carbon atoms; the (3-b) R$^3$s and the b X groups are as defined hereinabove referring to the general formula (4); and W is a group containing at least one active hydrogen selected from the group consisting of a hydroxyl group, a carboxyl group, a mercapto group and an amino (primary or secondary) group), as disclosed in Japanese Kokoku Publication S46-12154 (U.S. Pat. No. 3,632,557), Japanese Kokai Publications S58-109529 (U.S. Pat. No. 4,374,237), S62-13430 (U.S. Pat. No. 4,645,816), H08-53528 (EP 0676403), and H10-204144 (EP 0831108), Japanese Kohyo Publication 2003-508561 (U.S. Pat. No. 6,197,912), Japanese Kokai Publications H06-211879 (U.S. Pat. No. 5,364,955), H10-53637 (U.S. Pat. No. 5,756,751), H11-100427, 2000-169544, 2000-169545 and 2002-212415, Japanese Patent 3,313,360, U.S. Pat. Nos. 4,067,844 and 3,711,445, Japanese Kokai Publication 2001-323040, and the like. Mention may also be made of a method comprising reacting an active hydrogen-containing group occurring at an end of an organic polymer with the isocyanato group of a reactive silyl group-containing isocyanate compound represented by the general formula (10):

O=C=N—R$^9$—SiR$^3{}_{3-b}$X$_b$ (10)

(R$^9$, the (3-b) R$^3$s and the b X groups are as defined above referring to the general formula (9)), as disclosed in Japanese Kokai Publications H11-279249 (U.S. Pat. No. 5,990,257), 2000-119365 (U.S. Pat. No. 6,046,270), S58-29818 (U.S. Pat. No. 4,345,053), H03-47825 (U.S. Pat. No. 5,068,304), H11-60724, 2002-155145 and 2002-249538, WO 03/018658, WO 03/059981, and the like.

The active hydrogen-terminated group-containing organic polymer is not particularly restricted but includes, for example, hydroxyl group-terminated oxyalkylene polymers (polyether polyols), polyacrylic polyols, polyester polyols, hydroxyl group-terminated saturated hydrocarbon type polymers (polyolefin polyols), polythiol compounds and polyamine compounds.

Preferred among these are those organic polymers whose main chain skeleton comprises a polyether polyol, polyacrylic polyol and polyolefin polyol components, since they have a relatively low glass transition temperature and give cured products excellent in low-temperature resistance.

Those organic polymers comprising a polyether polyol component are low in viscosity, have good workability and give cured products showing good depth curability and adhesiveness, hence are particularly preferred. Curable compositions in which an organic polymer containing a polyacrylic polyol and saturated hydrocarbon type polymer component are more preferred since they give cured products having good weather resistance and thermal stability.

The polyether polyol preferably has, on an average, at least 0.7 terminal hydroxyl group per molecule.

The production method thereof is not particularly restricted but may be any of the methods known in the art, including, for example, a polymerization method using an alkali metal catalyst, and a polymerization method of an alkylene oxide using a polyhydroxy compound containing at least two hydroxyl groups per molecule as an initiator in the presence of a double metal cyanide complex or cesium.

Among the polymerization methods mentioned above, the polymerization method using a double metal cyanide complex is preferred since it gives polymers low in degree of unsaturation, narrow in molecular weight distribution (Mw/Mn) and low in viscosity, which give cured products excellent in acid resistance and weather resistance, among others.

The term "polyacrylic polyol" refers to a polyol whose skeleton is a (meth) acrylic acid alkyl ester (co) polymer and whose molecule contains a hydroxyl group.

As for the production method thereof, the living radical polymerization method is preferred and the atom transfer radical polymerization method is more preferred because of capability of their giving polymers narrow in molecular weight distribution and possibly low in viscosity. Also preferred is the polymerization method involving the so-called SGO process in which an acrylic acid alkyl ester type compound is continuously bulk-polymerized under high-temperature and high-pressure conditions, as disclosed in Japanese Kokai Publication 2001-207157. As such a polyacrylic polyol, there may be mentioned ARUFON UH-2000 (product of Toagosei Co., Ltd.), and the like.

The polyisocyanate compound is not particularly restricted but includes, for example, an aromatic type polyisocyanate such as toluene (tolylene) diisocyanate, diphenylmethane diisocyanate and xylylene diisocyanate; and an aliphatic type polyisocyanate such as isophorone diisocyanate and hexamethylene diisocyanate.

When the amide segment content is high in the main chain skeleton of the organic polymer serving as the (A) component in the practice of the present invention, the organic polymer shows a high viscosity and sometimes gives a composition poor in workability. Conversely, the amide segment in the main chain skeleton of the (A) component tends to improve the curability of the composition according to the present invention.

The silicon compound defined by the general formula (9) is not particularly restricted but there may be mentioned, for example, amino group-containing silane compounds such as γ-aminopropyltrimethoxysilane, N-(β-aminoethyl)-γ-aminopropyltrimethoxysilane, γ-(N-phenyl)aminopropyltrimethoxysilane, N-ethylaminoisobutyltrimethoxysilane, N-cyclohexylaminomethyltriethoxysilane, N-cyclohexylaminomethyldiethoxymethylsilane and N-phenylaminomethyltrimethoxysilane; hydroxyl group-containing silane compounds such as γ-hydroxypropyltrimethoxysilane; and mercapto group-containing silane compounds such as γ-mercaptopropyltrimethoxysilane. As the silicon compound represented by the general formula (9), there may further be mentioned Michael addition products derived from various α,β-unsaturated carbonyl compounds and a primary amino group-containing silane compound or Michael addition products derived from various (meth)acryloyl group-containing silane compounds and a primary amino group-containing compound, as disclosed in Japanese Kokai Publications H06-211879 (U.S. Pat. No. 5,364,955), H10-53637 (U.S. Pat. No. 5,756,751), H10-204144 (EP 0831108) 2000-169544 and 2000-169545. The reactive silyl group-containing isocyanate compound defined by the general formula (10) is not particularly restricted but includes, for example, γ-trimethoxysilylpropyl isocyanate, γ-triethoxysilylpropyl isocyanate, γ-methyldimethoxysilylpropyl isocyanate, γ-methyldiethoxysilylpropyl isocyanate, trimethoxysilylmethyl isocyanate, triethoxymethylsilylmethyl isocyanate, dimethoxymethylsilylmethyl isocyanate and diethoxymethylsilylmethyl isocyanate.

As the reactive silyl group-containing isocyanate compound defined by the general formula (10), there may further be mentioned the reaction products derived from a silicon compound of the general formula (9) and an excess of a polyisocyanate compound, as disclosed in Japanese Kokai Publication 2000-119365 (U.S. Pat. No. 6,046,270).

The hydrolyzable group represented by X in the general formula (4) is not particularly restricted but includes those hydrolyzable groups which are known in the art, for example, a hydrogen atom, halogen atoms, and an alkoxy group, an acyloxy group, a ketoxymate group, an amino group, an amide group, an acid amide group, an aminooxy group, a mercapto group and an alkenyloxy group. Among these, a hydrogen atom, an alkoxy group, an acyloxy group, a ketoxymate group, an amino group, an amide group, an aminooxy group, a mercapto group and an alkenyloxy group are preferred, and an alkoxy group is more preferred from the viewpoints of mild hydrolyzability and easy handleability.

The group $R^3$ in the general formula (4) is not particularly restricted but includes, for example, an alkyl group such as a methyl group and an ethyl group, a cycloalkyl group such as a cyclohexyl group, an aryl group such as a phenyl group, an aralkyl group such as a benzyl group, and a triorganosiloxy group represented by $—OSi(R')_3$ wherein R' is a methyl group, a phenyl group or the like. Among these, a methyl group is preferred. One silicon atom can have one to three groups selected from a hydrolyzable group or a hydroxyl group represented by X in the general formula (4) bound thereto. When the reactive silyl group has two or more hydrolyzable groups and hydroxyl groups bound thereto, these groups may be the same group or may be different groups.

It is preferable that b in the general formula (4) is an integer 2 or 3 from the curability viewpoint, and is more preferable that b is an integer 3.

The reactive silyl group defined by the general formula (4) includes a trimethoxysilyl group, a triethoxysilyl group, a triisopropoxysilyl group, a dimethoxymethylsilyl group, a diethoxymethylsilyl group and a diisopropoxymethylsilyl group. Among these, a trimethoxysilyl group, a triethoxysilyl group and a dimethoxymethylsilyl group are preferred since they have high activity and afford good curability, and trimethoxysilyl group is more preferred. Further, dimethoxymethylsilyl group is particularly preferred from the storage stability viewpoint.

Further, a triethoxysilyl group and a diethoxymethylsilyl group are particularly preferred since the alcohol formed upon hydrolysis reaction of the reactive silyl group is highly safe ethanol.

A method of introducing the reactive silyl group is not particularly restricted but includes such methods known in the art as the methods (a) to (c) shown below.

(a) A method comprising: reacting a polymer containing such a functional group as a hydroxyl group in the molecule with an organic compound containing an active group reactive with this functional group as well as an unsaturated group to give an unsaturated group-containing polymer; or copolymerizing a polymer containing such a functional group as a hydroxyl group in the molecule with an unsaturated group-containing epoxy compound to give an unsaturated group-containing polymer, and then reacting the reaction product obtained with a reactive silyl group-containing hydrosilane for hydrosilylation.

(b) A method comprising reacting the unsaturated group-containing organic polymer obtained in the same manner as described above in (a) with a compound containing a mercapto group and a reactive silyl group.

(c) A method comprising reacting an organic polymer containing such a functional group as a hydroxyl group, an epoxy group or an isocyanato group in the molecule with a compound containing a functional group reactive with this function group and a reactive silyl group.

Among these methods, the method (a) or the method (c) in such a mode that a hydroxyl group-terminated polymer is reacted with a compound containing an isocyanato group and reactive silyl group is preferred in view of the fact that a high conversion rate can be attained in a relatively short period of time. The method (a) is more preferred since curable compositions based on the reactive silyl group-containing organic polymer obtained by the method (a) tends to be lower in viscosity than curable compositions based on the organic polymer obtained by the method (c) and, as a result, curable compositions having good workability can be obtained and, further, the organic polymer obtained by the method (b) has a stronger mercaptosilane-due odor as compared with the organic polymer obtained by the method (a).

The hydrosilane compound to be used in carrying out the method (a) is not particularly restricted but includes, for example, halogenated hydrosilanes such as trichlorosilane, methyldichlorosilane, dimethylchlorosilane and phenyldichlorosilane; alkoxysilanes such as trimethoxysilane, triethoxysilane, methyldiethoxysilane, methyldimethoxysilane, phenyldimethoxysilane and 1-[2-(trimethoxysilyl)ethyl]-1,1,3,3-tetramethyldisiloxane; acyloxyhydrosilanes such as methyldiacetoxysilane and phenyldiacetoxysilane; and ketoxymatehydrosilanes such as bis(dimethylketoxymate)methylsilane and bis(cyclohexylketoxymate)methylsilane. Among these, halogenated hydrosilanes and alkoxyhydrosilanes are preferred, and alkoxyhydrosilanes are more preferred because of the mild hydrolyzability and easy handleability of curable compositions based on the organic polymer (A) obtained.

Among the alkoxyhydrosilanes, methyldimethoxysilane is preferred because of its ready availability and excellent various characteristics (curability, storage stability, elongation characteristic, tensile strength, etc.) of curable compositions based on the organic polymer (A) obtained and cured products.

The synthetic method (b) is not particularly restricted but may be, for example, the method of introducing a mercapto group- and reactive silyl group-containing compound into an unsaturated-bond site in the organic polymer by a radical addition reaction in the presence of a radical initiator and/or a radical generation source. The mercapto group- and reactive silyl group-containing compound is not particularly restricted but includes, for example, γ-mercaptopropyltrimethoxysilane, γ-mercaptopropylmethyldimethoxysilane, γ-mercaptopropyltriethoxysilane, γ-mercaptopropylmethyldiethoxysilane, mercaptomethyltrimethoxysilane and mercaptomethyltriethoxysilane.

The method of reacting a hydroxyl group-terminated polymer with an isocyanato group- and reactive silyl group-containing compound according to the synthetic method (c) is not particularly restricted but may be, for example, a method disclosed in Japanese Kokai Publication H03-47825. The isocyanato group- and reactive silyl group-containing compound is not particularly restricted but includes, for example, γ-isocyanatopropyltrimethoxysilane, γ-isocyanatopropylmethyldimethoxysilane, γ-isocyanatopropyltriethoxysilane, γ-isocyanatopropylmethyldiethoxysilane, isocyanatomethyltrimethoxysilane, isocyanatomethyltriethoxysilane, isocyanatomethyldimethoxymethylsilane and isocyanatomethyldiethoxymethylsilane.

In the case of silane compounds containing a silicon atom with three hydrolyzable groups bound thereto, for example trimethoxysilane, the disproportionation reaction may proceed rapidly in certain cases. The progress of the disproportionation reaction may sometimes result in the formation of such a dangerous compound as dimethoxysilane.

In the case of γ-mercaptopropyltrimethoxysilane and γ-isocyanatopropyltrimethoxysilane, however, such disproportionation reaction will not proceed. Therefore, in the case of using, as the silyl group, a group containing a silicon atom with three hydrolyzable groups bound thereto, for example a trimethoxysilyl group, the synthetic method (b) or (c) is preferably employed. On the other hand, in the case of silane compounds represented by the general formula (11):

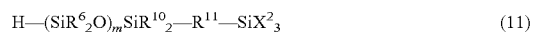

$$H-(SiR^6_2O)_m SiR^{10}_2-R^{11}-SiX^2_3 \qquad (11)$$

(wherein the three $X^2$s each independently is a hydroxyl group or a hydrolyzable group; the (2 m+2) $R^{10}$s each independently is a hydrocarbon group, preferably, from the availability and cost viewpoint, a hydrocarbon group containing 1 to 20 carbon atoms, more preferably a hydrocarbon group containing 1 to 8 carbon atoms, particularly preferably a hydrocarbon group containing 1 to 4 carbon atoms; $R^{11}$ is a divalent organic group, preferably, from the availability and cost viewpoint, a divalent hydrocarbon group containing 1 to 12 carbon atoms, more preferably a divalent hydrocarbon group containing 2 to 8 carbon atoms, particularly preferably a divalent hydrocarbon group containing 2 carbon atoms; and m is an integer of 0 to 19, preferably, from the availability and cost viewpoint, 1), the disproportionation reaction will not proceed.

Therefore, for introducing a group containing a silicon atom with three hydrolyzable groups bound thereto by the synthetic method (a), a silane compound represented by the general formula (11) is preferably used.

As the silane compound represented by the general formula (11), there may be mentioned 1-[2-(trimethoxysilyl)ethyl]-1,1,3,3-tetramethyldisiloxane, 1-[2-(trimethoxysilyl)propyl]-1,1,3,3-tetramethyldisiloxane and 1-[2-(trimethoxysilyl)hexyl]-1,1,3,3-tetramethyldisiloxane.

The reactive silyl group-containing organic polymer (A) to be used may have either a straight chain structure or a branched chain structure in the molecule thereof, and the number average molecular weight thereof, as expressed in terms of the value on a polystyrene equivalent basis as derived from the value measured by GPC, is preferably 500 to 100,000, more preferably 1,000 to 50,000, particularly preferably 3,000 to 30,000. When the number average molecular weight is lower than 500, the cured products obtained tend to be inferior in elongation characteristics and, when it is in excess of 100,000, the resulting curable composition becomes high in viscosity and tends to be inferior in workability.

The number of reactive silyl groups contained in each molecule of the organic polymer (A) is preferably not smaller than ion an average; it is preferably 1.1 to 5. When the number of reactive silyl groups contained in each molecule is smaller than 1 on an average, the curable composition tends to be inferior in curability and the cured products obtained show a tendency toward failure to exhibit a good rubber elastic behavior.

The reactive silyl group may occur at a main chain end or at a side chain end, or at both. In particular, when the reactive silyl group occurs only at a main chain end, the effective network size in the organic polymer component contained in the cured products obtained becomes increased, so that it becomes easy to obtain rubber-like cured products showing high strength, high elongation and low elastic modulus.

The curable composition according to the present invention essentially comprises a guanidine compound represented by the general formula (1) (hereinafter sometimes referred to as "component (B-1)" or "guanidine compound (B-1)") as a constituent (B).

By virtue of the use of a guanidine compound (B-1) represented by the general formula (1) as a silanol condensation catalyst for the reactive silyl group-containing organic polymer (A), the curable composition of the invention is excellent in surface curability and depth curability in spite of the catalyst being a non-organotin type catalyst, and the cured products obtained therefrom are excellent in adhesiveness.

$R^1N=C(NR^1_2)_2$ (1)

(In the formula, one of the five $R^1$s is an aryl group and the other four $R^1$s each independently is a hydrogen atom or a hydrocarbon group in which the carbon atom at position 1 is saturated.)

For obtaining a curable composition capable of satisfying all the necessary curing characteristics (surface curability, depth curability, adhesiveness, etc.), it is necessary that one of the five $R^1$s appearing in the general formula (1) should be an aryl group.

This is because when two or more of the five $R^1$s are aryl groups, for example in the case of diphenylguanidine, the surface curability and/or depth curability of the curable composition tends to greatly decline while, on the other hand, when none of the five $R^1$s is an aryl group, for example in the case of tetramethylguanidine, the surface curability of the curable composition also tends to decline and the cured products obtained tend to show insufficient adhesiveness.

The aryl group in the guanidine compound (B-1) is not particularly restricted but may be, for example, a phenyl group, a 2-methylphenyl group, a 3-methylphenyl group, a 4-methylphenyl group, a 2,4-dimethylphenyl group, a 2,6-dimethylphenyl group, a 2,4,6-trimethylphenyl group, a 2-chlorophenyl group, a 3-chlorophenyl group, a 2,4-dichlorophenyl group, a 2,6-dichlorophenyl group, a 2-hydroxyphenyl group, a 4-hydroxyphenyl group, a 2-aminophenyl group, a 4-aminophenyl group, a 2,4-diaminophenyl group, a 4-(dimethylamino)phenyl group, a 4-nitrophenyl group, a 4-cyanophenyl group, a 4-sulfonylphenyl group, a 4-methoxyphenyl group, a 4-ethoxyphenyl group, a 4-benzyloxyphenyl group, a 4-phenoxyphenyl group, a 4-carboxyphenyl group, a 4-acetoxyphenyl group, a 4-benzoylphenyl group, a 4-(ethoxycarbonyl)phenyl group, a 4-(phenoxycarbonyl) phenyl group, a 4-guanidinophenyl group, a 2,4-diguanidinophenyl group, a 4-(acetylamino)phenyl group, a 4-(benzoylamino)phenyl group, a 4-(dimethylaminosulfonyl) phenyl group, a 2-methyl-4-methoxyphenyl group, a 2-methyl-4-nitrophenyl group, a 2-methoxy-4-guanidinophenyl group, a 2-methoxy-4-(acetylamino)phenyl group, a naphthyl group or a biphenyl group.

Among these, a phenyl group, a 2-methylphenyl group, a 3-methylphenyl group, a 4-methylphenyl group, a 4-aminophenyl group and a 4-guanidinophenyl group are preferred, and a phenyl group and a 2-methylphenyl group are more preferred, since they are readily available and enhance the surface curability of the organic polymer (A) and the cured products obtained show good adhesiveness.

For the same reasons as mentioned above, the guanidine compound (B-1) is preferably a guanidine compound represented by the general formula (2), more preferably a guanidine compound represented by the general formula (3), specifically preferably 1-phenylguanidine or 1-(o-tolyl)guanidine.

[Chem. 5]

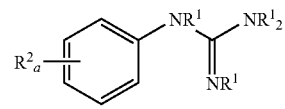

(2)

(In the formula, the four $R^1$s each independently is a hydrogen atom or a hydrocarbon group in which the carbon atom at position 1 is saturated; the a $R^2$s each independently is a hydrogen atom, a halogen atom, a hydroxyl group, an amino group, a nitro group, a cyano group, a sulfonic acid group or an organic group, and a is an integer of 0 to 5.)

[Chem. 6]

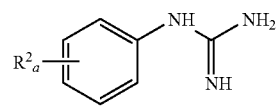

(3)

(In the formula, the a $R^2$s each independently is a hydrogen atom, a halogen atom, a hydroxyl group, an amino group, a nitro group, a cyano group, a sulfonic acid group or an organic group, and a is an integer of 0 to 5.)

For obtaining a curable composition capable of satisfying all performance characteristics including good surface curability, depth curability and adhesiveness, it is necessary that four $R^1$s among the five $R^1$s in the general formula (1) and the four $R^1$s in the general formula (2) each be a hydrogen atom or a hydrocarbon group in which the carbon atom at position 1 is saturated.

As the compounds in which $R^1$ is a hydrocarbon group wherein the carbon atom at position 1 is unsaturated, there may be mentioned, for example, biguanide compounds (compounds in which one of the $R^1$s is an organic group represented by —C(=NH)—NH$_2$).

In cases where $R^1$ is a hydrocarbon group containing an unsaturated bond on the carbon atom at position 1, for example in the case of biguanide compounds, the surface curability and depth curability of the curable composition tends to decline.

Therefore, in the guanidine compound (B-1) represented by the general formula (1), which is to be incorporated as a silanol condensation catalyst in the curable composition of the invention, the hydrocarbon group is required to be one containing no unsaturated bond on the carbon atom at position 1.

$R^1$ is not particularly restricted provided that the carbon atom at position 1 is saturated. Thus, it may be a saturated or unsaturated hydrocarbon group; a hydrocarbon group having a substituent containing at least one selected from the group consisting of a hydrogen atom, a carbon atom, a nitrogen atom, an oxygen atom and a sulfur atom. Among them, a hydrogen atom or a saturated hydrocarbon group is preferred in view of good surface curability of the curable composition obtained; a hydrogen atom is more preferred.

In the case of $R^1$ being a hydrocarbon group, the number of carbon atoms is preferably 1 to 50, more preferably 1 to 20, particularly preferably 1 to 10, from the ready availability viewpoint.

As the a $R^2$ groups in the general formula (2) or general formula (3), there may be mentioned a hydrogen atom, a halogen atom, a hydroxyl group, an amino group, a nitro group, a cyano group, a sulfonic acid group, or an organic group.

In the case of $R^2$ being an organic group, $R^2$ is not particularly restricted but includes saturated or unsaturated hydrocarbon groups; organic groups having a substituent(s) containing at least one selected from the group consisting of a hydrogen atom, a carbon atom, a nitrogen atom, an oxygen atom and a sulfur atom; and an alkoxy group, a carboxy group, an acyl group, a carbonyl group, an imino group and a sulfonyl group.

Among the above-mentioned functional groups, a hydrogen atom, an amino group or an organic group is preferred, a hydrogen atom or a saturated hydrocarbon group is more preferred, and a hydrogen atom is particularly preferred since they increase curability of the organic polymer (A). In cases where $R^2$ is an organic group, the number of carbon atoms contained therein is preferably 1 to 20, more preferably 1 to 10, from the ready-availability viewpoint.

In the formula, a is an integer 0 to 5.

The guanidine compound (B-1) preferably has a molecular weight of not smaller than 135, more preferably not smaller than 140, particularly preferably not smaller than 150. When the molecular weight is low, the volatility of the compound becomes increased, causing a tendency toward pollution of the work environment. It is not necessary to particularly specify the upper limit to the molecular weight of the guanidine compound (B-1); it is generally preferred, however, that the molecular weight be not higher than 100,000.

The guanidine compound (B-1) is not particularly restricted but includes, 1-phenylguanidine, 2-phenylguanidine, 1-(o-tolyl)guanidine, 1-(m-tolyl)guanidine, 1-(p-tolyl) guanidine, 1-(4-octylphenyl)guanidine, 1-(2,6-dimethylphenyl)guanidine, 1-(2,4,6-trimethylphenyl)guanidine, 1-(4-chlorophenyl)guanidine, 1-(3,4-dichlorophenyl)guanidine, 1-[3-(trifluoromethyl)phenyl]guanidine, 4-guanidinophenol, 1-(4-methoxyphenyl)guanidine, 1-(3,4-dimethoxyphenyl) guanidine, 1,1'-[4-(dodecyloxy)-m-phenylene]bisguanidine, 1-(2-aminophenyl)guanidine, 1-(4-aminophenyl)guanidine, 1-(2-guanidinophenyl)guanidine, 1-(4-guanidinophenyl) guanidine, 1-(3-nitrophenyl)guanidine, 1-(4-nitrophenyl) guanidine, 4-guanidinobenzoic acid, 3,5-diguanidinobenzoic acid, 4-tert-butylphenyl 4-guanidinobenzoate, 3-amino-5-guanidinobenzoic acid, 4-guanidinophenyl 4-phenylbutanoate, 4-guanidinobenzamide, N,N-dioctadecyl-4-guanidinobenzamide, 1-(2-naphtyl)guanidine, 1-methyl-1-phenylguanidine, 1-methyl-3-phenylguanidine, 1,1-dimethyl-3-phenylguanidine, 1,1,3,3-tetramethyl-2-phenylguanidine, 1-cyclohexyl-3-(3-methylphenyl) guanidine, 1-(4-guanidinophenyl)-3-hexylguanidine, 1,1-dimethyl-3-(4-aminophenyl)guanidine, 1-(4-chlorophenyl)-3-(1-methylethyl)guanidine, 1-(3,4-dichlorophenyl)-3-(1-methylethyl)guanidine, 1-(4-methylphenyl)-3-octylguanidine, 1,3-diisopropyl-2-(2-naphthyl)guanidine, 2-(phenyl)mino)imidazolidine, N-(2-imidazolin-2-yl)-2,3-xylidine, N-(2-imidazolin-2-yl)-1-naphthalenamine, 2-[(5,6,7,8-tetrahydronaphthalen-1-yl)amino]-2-imidazoline, 7-phenyl-1,5,7-triazabicyclo[4.4.0]dec-5-ene, 1'-[methylenebis(p-phenylene)]bisguanidine, 1,3-bis(3-guanidinophenyl)guanidine, 1,8-bis(1,1,3,3-tetramethylguanidin-2-yl) naphthalene and N-(tert-butoxycarbonyl)-β-alanine 6-guanidino-1-naphthyl.

Either a single species among these guanidine compounds may be incorporated in the curable composition or a combination of a plurality thereof may be incorporated in the curable composition.

Among the above-mentioned guanidine compounds, 1-phenylguanidine, 1-(o-tolyl)guanidine, 1-(p-tolyl)guanidine, 1-(2,6-dimethylphenyl)guanidine, 1-(4-aminophenyl) guanidine, 1-(2-guanidinophenyl)guanidine and 1,1-dimethyl-3-phenylguanidine are preferred, 1-phenylguanidine and 1-(o-tolyl) guanidine are more preferred, and 1-phenylguanidine is particularly preferred from the viewpoints of ready-availability, increase in surface curability and depth curability of the organic polymer (A), and good adhesiveness of the curable composition obtained.

The addition level of the guanidine compound (B-1) is essentially 0.001 to 20 parts by weight, more preferably 0.01 to 15 parts by weight, and particularly preferably 0.1 to 10 parts by weight, per 100 parts by weight of the (A) component organic polymer.

When the addition level of the guanidine compound (B-1) is below 0.001 part by weight, the curable composition may fail to obtain a practical rate of curing and it tends to become difficult for the curing reaction to proceed to a sufficient extent. On the other hand, when the level of addition of the guanidine compound (B-1) is above 20 parts by weight, the curing time of the curable composition becomes too short, hence the workability tends to become worsened.

While the curable composition of the present invention uses a guanidine compound (B-1) as a silanol condensation catalyst, another curing catalyst is preferably used as a constituent (D) in combination with the guanidine compound so long as the effects of the present invention will not be reduced.

The curing catalyst other than the guanidine compound used as the constituent (D) is not particularly restricted but includes, for example, carboxylic acid metal salts such as tin carboxylates, lead carboxylates, bismuth carboxylates, potassium carboxylates, calcium carboxylates, barium carboxylates, titanium carboxylates, zirconium carboxylates, hafnium carboxylates, vanadium carboxylates, manganese carboxylates, iron carboxylates, cobalt carboxylates, nickel carboxylates and cerium carboxylates; titanium compounds such as tetrabutyl titanate, tetrapropyl titanate, titanium tetrakis(acetylacetonate), bis(acetylacetonato)diisopropoxytitanium and diisopropoxytitanium bis(ethyl acetoacetate); organotin compounds such as dibutyltin dilaurate, dibutyltin maleate, dibutyltin phthalate, dibutyltin dioctanoate, dibutyltin bis(2-ethylhexanoate), dibutyltin bis(methyl maleate), dibutyltin bis(ethyl maleate), dibutyltin bis(butyl maleate), dibutyltin bis(octyl maleate), dibutyltin bis(tridecyl maleate), dibutyltin bis(benzyl maleate), dibutyltin diacetate, dioctyltin bis(ethyl maleate), dioctyltin bis(octyl maleate), dibutyltin dimethoxide, dibutyltin bis(nonylphenoxide), dibutenyltin oxide, dibutyltin oxide, dibutyltin bis(acetylacetonate), dibutyltin bis(ethyl acetoacetate), reaction products of dibutyltin oxide-silicate compound and reaction products of dibutyltin oxide-phthalic acid ester; aluminum compounds such as aluminum tris(acetylacetonate), aluminum tris(ethyl acetoacetate) and diisopropoxyaluminum ethyl acetoacetate; zirconium compounds such as zirconium tetrakis(acetylacetonate); various metal alkoxides such as tetrabutoxyhafnium; inorganic acids such as hydrochloric acid, phosphoric acid and boronic acid; and so forth.

The combined use of the curing catalysts other than the guanidine compounds is expected to increase the catalytic activity and improve such characteristics as depth curability, thin layer curability and adhesiveness.

Among those enumerated above, titanium compounds and aluminum compounds, among others, are preferred since the surface curability of the organic polymer (A) is more enhanced by the use thereof; diisopropoxytitanium bis(ethyl acetoacetate) and diisopropoxyaluminum ethyl acetoacetate are more preferred.

The combined use of titanium compounds is also preferred since the use gives curable compositions with increased strength and elongation; among them, diisopropoxytitanium bis(ethyl acetoacetate) is more preferred.

The addition level of the titanium compounds and aluminum compounds are preferably 0.001 to 20 parts by weight, more preferably 0.01 to 15 parts by weight, particularly preferably 0.1 to 10 parts by weight, per 100 parts by weight of the component (A).

On the other hand, the addition level of the organotin compounds is preferably low from the toxicity viewpoint. When the organotin compounds are added, the addition level thereof is preferably not more than 5 parts by weight as metal tin, more preferably 0.5 parts by weight, still more preferably 0.05 parts by weight; substantial absence thereof is particularly preferred.

From the above viewpoint, the curable composition of the present invention is preferably a non-organotin type curable composition. The organotin compound addition level in the "non-organotin type curable composition" so referred to herein is such that the organotin compound amounts to not more than 50% by weight, preferably not more than 30% by weight, more preferably not more than 10% by weight, still more preferably not more than 1% by weight, of the compound components acting as silanol condensation catalysts; substantial absence thereof is particularly preferred.

The curable composition of the present invention is preferably a non-organotin type curable composition and, from the viewpoints of toxicity and environmental stress, it is more preferably a tin-free curable composition containing substantially none of such tin compounds as organotin type compounds and tin carboxylates, still more preferably an organotin-free and carboxylic acid metal salt-free curable composition containing substantially none of organotin compounds and various carboxylic acid metal salts, particularly preferably a metal catalyst-free curable composition containing substantially none of the above-mentioned metal element-containing curing catalysts such as carboxylic acid metal salts, titanium compounds, organotin compounds, organoaluminum compounds and zirconium compounds.

In cases where a metal compound other than an organotin is used in combination, the addition level thereof more specifically is preferably not higher than 5 parts by weight, more preferably not higher than 2 parts by weight, per 100 parts by weight of the organic polymer (A), and substantial absence thereof is most preferred.

The curable composition of the present invention preferably contains organic acids (hereinafter, also referred to as organic acids (C)) as a constituent (C).

Organic acids (C) function as a promoter for increasing catalytic activity. The organic acids used as a promoter are not particularly restricted but include: straight-chain saturated fatty acids such as acetic acid, propionic acid, butyric acid, valeric acid, caproic acid, enanthic acid, caprylic acid, 2-ethylhexanoic acid, pelargonic acid, capric acid, undecanoic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, montanic acid, melissic acid and lacceric acid; monoenoic unsaturated fatty acids such as undecylenic acid, linderic acid, tsuzuic acid, physeteric acid, myristoleic acid, 2-hexadecenoic acid, 6-hexadecenoic acid, 7-hexadecenoic acid, palmitoleic acid, petroselinic acid, oleic acid, elaidic acid, asclepic acid, vaccenic acid, gadoleic acid, gondoic acid, cetoleic acid, erucic acid, brassidic acid, selacholeic acid, ximenic acid, lumequeic acid, acrylic acid, methacrylic acid, angelic acid, crotonic acid, isocrotonic acid and 10-undecenoic acid; polyenoic unsaturated fatty acids such as linoelaidic acid, linolic acid, 10,12-octadecadienoic acid, hiragonic acid, α-eleostearic acid, β-eleostearic acid, punicic acid, linolenic acid, 8,11,14-eicosatrienoic acid, 7,10,13-docosatrienoic acid, 4,8,11,14-hexadecatetraenoic acid, moroctic acid, stearidonic acid, arachidonic acid, 8,12,16,19-docosatetraenoic acid, 4,8,12,15,18-eicosapentaenoic acid, clupanodonic acid, nisinic acid and docosahexaenoic acid; branched fatty acids such as 1-methylbutyric acid, isobutyric acid, 2-ethylbutyric acid, isovaleric acid, tuberculostearic acid, pivalic acid, 2,2-dimethylbutyric acid, 2-ethyl-2-methylbutyric acid, 2,2-diethylbutyric acid, 2,2-dimethylvaleric acid, 2-ethyl-2-methylvaleric acid, 2,2-diethylvaleric acid, 2,2-dimethylhexanoic acid, 2,2-diethylhexanoic acid, 2,2-dimethyloctanoic acid, 2-ethyl-2,5-dimethylhexanoic acid, neodecanoic acid and versatic acid; triple bond-containing fatty acids such as propiolic acid, tariric acid, stearolic acid, crepenynic acid, xymenynic acid and 7-hexadecynoic acid; alicyclic carboxylic acids such as naphthenic acid, malvalic acid, sterculic acid, hydnocarpic acid, chaulmoogric acid, gorlic acid, 1-methylcyclopentanecarboxylic acid, 1-methylcyclohexanecarboxylic acid, 2-methylbicyclo[2.2.1]-5-heptene-2-carboxylic acid, 1-adamantanecarboxylic acid, bicycle[2.2.1]heptanes-1-carboxylic acid and bicycle[2.2.2]octane-1-carboxylic acid; oxygen-containing fatty acids such as acetoacetic acid, ethoxyacetic acid, glyoxylic acid, glycolic acid, gluconic acid, sabinic acid, 2-hydroxytetradecanoic acid, ipurolic acid, 2,2-dimethyl-3-hydroxypropionic acid, 2-hydroxyhexadecanoic acid, jalapinolic acid, juniperic acid, ambrettolic acid, aleuritic acid, 2-hydroxyoctadecanoic acid, 12-hydroxyoctadecanoic acid, 18-hydroxyoctadecanoic acid, 9,10-dihydroxyoctadecanoic acid, ricinolic acid, camlolenic acid, licanic acid, pheronic acid, cerebronic acid and 2-methyl-7-oxabicyclo[2.2.1]-5-heptene-2-carboxylic acid; and halogen-substituted monocarboxylic acids such as chloroacetic acid, 2-chloroacrylic acid and chlorobenzoic acid. As far as aliphatic dicarboxylic acids are concerned, there may be mentioned saturated dicarboxylic acids such as adipic acid, azelaic acid, pimelic acid, suberic acid, sebacic acid, ethylmalonic acid, glutaric acid, oxalic acid, malonic acid, succinic acid, oxydiacetic acid, dimethylmalonic acid, ethylmethylmalonic acid, diethylmalonic acid, 2,2-dimethylsuccinic acid, 2,2-diethylsuccinic acid, 2,2-dimethylglutaric acid and 1,2,2-trimethyl-1,3-cyclopentanedicarboxylic acid; and unsaturated dicarboxylic acids such as maleic acid, fumaric acid, acetylenedicarboxylic acid and itaconic acid. As far as aliphatic polycarboxylic acids are concerned, there may be mentioned tricarboxylic acids such as aconitic acid, 4,4-dimethylaconitic acid, citric acid, isocitric acid and 3-methylisocitric acid. As aromatic carboxylic acids, there may be mentioned aromatic monocarboxylic acids such as benzoic acid, 9-anthracenecarboxylic acid, atrolactic acid, anisic acid, isopropylbenzoic acid, salicylic acid and toluic acid; and aromatic polycarboxylic acids such as phthalic acid, isophthalic acid, terephthalic acid, carboxyphenylacetic acid and pyromellitic acid; monovalent phenols such as phenol, o-cresol, m-cresol, p-cresol, 2-isopropylphenol, 2-tert-butylphenol, 2-sec-butylphenol, 4-tert-butylphenol, 4-sec-butylphenol, 2-aminophenol, 4-cumylphenol, 3,5-dimethylphenol, 2,3,6-tributylphenol, and styrenated phenol; and polyvalent phenols such as catechol, resorcinol, hydroquinone, pyrogallol, and tannic acid; organic acid phosphoric acid esters; organic sulfonic acids such as trifluoromethanesulfonic acid and dodecylbenzenesulfonic acid; and so forth.

Among the organic acids (C) used as the promoters mentioned above, lauric acid, neodecanoic acid, salicylic acid, phenol, o-cresol, and dodecylbenzenesulfonic acid are preferred, neodecanoic acid and dodecylbenzenesulfonic acid are more preferred, since they further enhance the surface curability of the organic polymer (A) and are readily available.

The combined use of sulfonic acids is preferred since the solubility of the guanidine compound (B-1) into the curable composition is increased thereby; among them, dodecylbenzenesulfonic acid is more preferred in view of its ready availability.

The addition level of the organic acids (C) is preferably 0.01 to 20 parts by weight, more preferably 0.01 to 10 parts by weight, particularly preferably 1 to 5 parts by weight, per 100 parts by weight of the (A) component organic polymer.

In the curable composition of the present invention, there is incorporated an adhesiveness-imparting agent, if necessary. The adhesiveness-imparting agent is a compound containing a hydrolyzable silyl group and other functional group in the molecule, and has an effect to greatly improve, under nonprimer conditions or primer treatment conditions, adhesiveness between the cured products obtained and the following adherends: inorganic substrates such as glass, aluminum, stainless steel, zinc, copper and mortar; organic substrates such as polyvinyl chloride, acryl, polyester, polyethylene, polypropylene and polycarbonate.

In particular, when such adhesiveness-imparting agent is used under nonprimer conditions, the improving effect on the adhesiveness of the cured products to various adherends is particularly significant. In addition to these effects, the adhesiveness-imparting agent is a compound capable of functioning as a physical property modifier and as a dispersibility improving agent for inorganic fillers, among others.

As the hydrolyzable silyl group in the adhesiveness-imparting agent, there may be mentioned those groups represented by the general formula (4) in which X is a hydrolyzable group. More specifically, there may be mentioned those groups described hereinabove as hydrolyzable groups referring to the modes of embodiment of the polymer (A). Among those, a methoxy group, an ethoxy group and like groups are preferred from the mild hydrolyzability and easy handleability points of view. The number of hydrolyzable groups bound to a silicon atom is preferably not smaller than 2, more preferably not smaller than 3.

The functional group other than the hydrolyzable silyl group is not particularly restricted, and there may be mentioned, for example, a substituted or unsubstituted amino group, mercapto group, epoxy group, carboxyl group, vinyl group, isocyanato group and isocyanurate group, and halogen atoms. In particular, a substituted or unsubstituted amino group, epoxy group, isocyanato group and isocyanurate are preferred since the cured products obtained show a high adhesiveness improving effect; an amino group is more preferred.

The adhesiveness-imparting agent is not particularly restricted but includes isocyanatosilanes such as γ-isocyanatopropyltrimethoxysilane, γ-isocyanatopropyltriethoxysilane, γ-isocyanatopropylmethyldiethoxysilane, γ-isocyanatopropylmethyldimethoxysilane, (isocyanatomethyl)trimethoxysilane and (isocyanatomethyl)dimethoxymethylsilane; aminosilanes such as γ-aminopropyltrimethoxysilane, γ-aminopropyltriethoxysilane, γ-aminopropyltriisopropoxysilane, γ-aminopropylmethyldimethoxysilane, γ-aminopropylmethyldiethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, γ-(2-aminoethyl)aminopropyltriisopropoxysilane, γ-(2-(2-aminoethyl)aminoethyl)aminopropyltrimethoxysilane, γ-(6-aminohexyl)aminopropyltrimethoxysilane, 3-(N-ethylamino)-2-methylpropyltrimethoxysilane, 2-aminoethylaminomethyltrimethoxysilane, N-cyclohexylaminomethyltriethoxysilane, N-cyclohexylaminomethyldiethoxymethylsilane, γ-ureidopropyltrimethoxysilane, γ-ureidopropyltriethoxysilane, N-phenyl-γ-aminopropyltrimethoxysilane, N-phenylaminomethyltrimethoxysilane, N-benzyl-γ-aminopropyltrimethoxysilane, N-vinylbenzyl-γ-aminopropyltriethoxysilane, N-(3-triethoxysilylpropyl)-4,5-dihydroimidazole, N-cyclohexylaminomethyltriethoxysilane, N-cyclohexylaminomethyldiethoxymethylsilane, N-phenylaminomethyltrimethoxysilane, (2-aminoethyl)aminomethyltrimethoxysilane and N,N'-bis[3-(trimethoxysilyl)propyl]ethylenediamine; ketimine type silanes such as N-(1,3-dimethylbutylidene)-3-(triethoxysilyl)-1-propanamine; mercaptosilanes such as γ-mercaptopropyltrimethoxysilane, γ-mercaptopropyltriethoxysilane, γ-mercaptopropylmethyldimethoxysilane, γ-mercaptopropylmethyldiethoxysilane, mercaptomethyltrimethoxysilane and mercaptomethyltriethoxysilane; epoxysilanes such as γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane and β-(3,4-epoxycyclohexyl)ethyltriethoxysilane; carboxysilanes such as β-carboxyethyltriethoxysilane, β-carboxyethylphenylbis(2-methoxyethoxy)silane and N-β-(carboxymethyl)aminoethyl-γ-aminopropyltrimethoxysilane; vinyl type unsaturated group-containing silanes such as vinyltrimethoxysilane, vinyltriethoxysilane, γ-methacryloyloxypropylmethyldimethoxysilane, γ-acryloyloxypropyltriethoxysilane and methacryloyloxymethyltrimethoxysilane; halogen-containing silanes such as γ-chloropropyltrimethoxysilane; isocyanurates such as tris(3-trimethoxysilylpropyl)isocyanurate.

Further, the adhesiveness-imparting agent includes: reaction products of the aminosilanes and the epoxysilanes, reaction products of the aminosilanes and isocyanatosilanes, and reaction products of the aminosilanes and the silanes containing a (meth)acryloyloxy group; partially condensed condensates of the silanes; derivatives formed by modification thereof, such as amino-modified silyl polymers, silylated amino polymers, unsaturated aminosilane complexes, phenylamino long-chain alkylsilanes, aminosilylated silicones and silylated polyesters; and so forth.

The adhesiveness-imparting agent to be added may comprise a single species or a combination of a plurality of species.

The addition level of the adhesiveness-imparting agent is preferably 0.01 to 20 parts by weight, more preferably 0.1 to 10 parts by weight, particularly preferably 1 to 7 parts by weight, per 100 parts by weight of the polymer (A). When the addition level thereof is below 0.1 part by weight, any sufficient adhesiveness of the cured products may not be obtained in some instances. On the other hand, when the addition level thereof is in excess of 20 parts by weight, any practical rate of curing of the cured products may not be obtained in some instances and, further, sometimes, it becomes difficult for the curing reaction to proceed to a sufficient extent.

In addition to the above adhesiveness-imparting agents, compounds capable of improving adhesiveness may be added to the curable composition of the invention, if necessary. Such compounds are not particularly restricted but include, for example, epoxy resins, phenol resins, sulfur, alkyltitanates, aromatic polyisocyanates, and the like. These compounds to be added may comprise a single species or a combination of a plurality of species.

However, epoxy resins with certain addition levels may reduce catalytic activity of the guanidine compound (B-1). Thus, the addition level of the epoxy resins is preferably low. When epoxy resins are added, the addition level thereof is preferably 5 parts by weight, more preferably 0.5 parts by weight, per 100 parts by weight of the component (A); substantial absence thereof is particularly preferred.

To the curable composition of the present invention, there is added a filler, if necessary.

The filler is not particularly restricted but includes: reinforcing fillers such as fumed silica, precipitated silica, crystalline silica, fused silica, dolomite, silicic anhydride, hydrous silicic acid and carbon black; heavy calcium carbonate, colloidal calcium carbonate, magnesium carbonate, diatomaceous earth, calcined clay, clay, talc, titanium oxide, bentonite, organic bentonite, ferric oxide, fine aluminum powder, flint powder, zinc oxide, activated zinc white, shirasu balloons, glass microballoons, organic microballoons based on a phenol resin or a vinylidene chloride resin, organic powders such as PVC powder and PMMA powder; and fibrous fillers such as asbestos, glass fibers and filaments.

When a filler is added, the addition level thereof is preferably 1 to 250 parts by weight, more preferably 10 to 200 parts by weight, per 100 parts by weight of the organic polymer (A).

On the occasion of using the curable composition as a one-pack type adhesive or sealant, it is preferred, for obtaining good storage stability, that such a filler as mentioned above be uniformly mixed with a dehydrating agent such as calcium oxide and the mixture be allowed to stand in a sealed bag made of an airtight material for a proper period of time for dehydrating and drying, and then used, as disclosed in Japanese Kokai Publication 2001-181532 and the like.

When the cured products obtained are to be used in the fields of application where transparency is required, a polymer powder containing a polymer of methyl methacrylate and the like, and noncrystalline silica, are preferred as the filler to be added, as disclosed in Japanese Kokai Publication H11-302527 and the like; hydrophobic silica and the like, as disclosed in Japanese Kokai Publication 2000-38560 and the like, is more preferred.

The hydrophobic silica, so referred to herein, is a product derived by treating the surface of the silicon dioxide fine powder generally occupied by silanol (—SiOH) groups with an organosilicon halide or an alcohol for conversion of those groups to (—SiO-hydrophobic) groups. The hydrophobic silica is not particularly restricted but includes, for example, products obtained by treating silanol groups occurring on a silicon dioxide fine powder with dimethylsiloxane, hexamethyldisilazane, dimethyldichlorosilane, trimethoxyoctylsilane, trimethylsilane, and the like. The untreated silicon dioxide fine powder whose surface is occupied by silanol (—SiOH) groups is called hydrophilic silica fine powder.

When the cured products obtained are to be used in the fields of application where high strength is required, silicon compounds such as fumed silica, precipitated silica, crystalline silica, fused silica, dolomite, silicic anhydride and hydrous silicic acid; carbon black, surface-treated finely divided calcium carbonate, calcined clay, clay, activated zinc white and the like are preferred as the filler to be added, and the addition level thereof is preferably 1 to 200 parts by weight per 100 parts by weight of the organic polymer (A).

Further, when the cured products obtained are to be used in the fields of application where low strength and high elongation modulus are required, titanium oxide, calcium carbonate such as heavy calcium carbonate, magnesium carbonate, talc, ferric oxide, zinc oxide and shirasu balloons are preferred as the filler to be added, and the addition level thereof is preferably 5 to 200 parts by weight per 100 parts by weight of the organic polymer (A).

When calcium carbonate is added, the tendency toward improvements in the breaking strength, breaking elongation and adhesiveness of the cured products obtained increases as the specific surface area increases. Only one of these filler species may be added or a plurality of species thereof may be added in combination.

The example of addition of a plurality of additives is not particularly restricted but the combined use of a surface-treated fine calcium carbonate and a calcium carbonate larger in particle diameter such as heavy calcium carbonate is preferred since cured products excellent in physical characteristics can be obtained.

Preferred as the surface-treated fine calcium carbonate are those whose particle surface has been treated with a single species selected from fatty acids, fatty acid salts, resin acids, other organic carboxylic acids and organic carboxylic acid salts, and surfactants or a combination of these species for easy dispersion and increase in lipophilicity and whose particle diameter is not larger than 0.5 μm. Preferred as the calcium carbonate are those whose particle surface has been treated with fatty acids since they can improve activity of guanidine (B-1) and also improve surface curability and depth curability of the curable composition obtained.

Preferred as the calcium carbonate having a large particle diameter are those whose particle diameter is not smaller than 1 μm and whose particle surface has not been treated.

In cases where the curable composition is required to have good workability (releasability, etc.) or where the surface of the cured products obtained is required to be matted, organic balloons or inorganic balloons are preferred as the filler to be added. These fillers may be surface-treated or non-surface-treated, and only one species thereof may be added or a plurality of species thereof may be added in admixture. For improving the workability (releasability, etc.), the particle diameter of the balloons is preferably not larger than 0.1 mm and, for rendering the cured product surface matted, it is preferably 5 to 300 μm.

The curable composition of the present invention, which gives cured products excellent in chemical resistance, is suited for use, in particular, as a sealant, adhesive or like composition for siding boards in ceramic and like systems and for housing outside-wall joints and outside-wall tiles.

On the occasion of use in such fields of application, the cured products obtained appear or exist on the joints or like observable surfaces and, therefore, it is desirable that the cured product design be in harmony with the outside wall design. In recent years, in particular, the sputtering coating and the addition of colored aggregates, among others, have been employed for providing luxurious outside walls, so that the designs of cured products are becoming more and more important.

For obtaining luxurious designs, a scaly or granular substance is incorporated in the curable composition of the present invention. The addition of a granular substance gives sandy or sandstone-like rough surfaces, and the addition of a scaly substance gives surfaces rendered uneven due to scales.

The cured products obtained are in harmony with luxurious outside walls and are excellent in chemical resistance, so that the luxurious appearance thereof can be maintained for a long period of time.

The scaly or granular substance is not particularly restricted but includes, for example, one disclosed in Japanese Kokai Publication H09-53063, and the diameter thereof is properly selected according to the outside wall material and design and is preferably not smaller than 0.1 mm, more preferably 0.1 to 5.0 mm. In the case of a scaly substance, the thickness of scales is preferably 1/10 to 1/5 (0.01 to 1.00 mm) of the diameter.

When a scaly or granular substance is added, the addition level thereof is properly selected according to the size of the scaly or granular substance, the outside-wall material and design and other factors; preferably, the addition level is 1 to 200 parts by weight per 100 parts by weight of the curable composition.

The material of the scaly or granular substance is not particularly restricted but includes natural products such as silica sand and mica, synthetic rubbers, synthetic resins, and inorganic materials such as alumina. These may be appropriately colored according to the outside wall material, design, and so forth so that the design quality of the composition applied to joints and so forth may be enhanced.

Preferred methods of finishing are those disclosed in Japanese Kokai Publication H09-53063 and the like.

The scaly or granular substance may be incorporated in advance in the curable composition or may be admixed with the curable composition of the occasion of use thereof.

It is also possible, for the same purposes, to add balloons (preferably having an average particle diameter of not smaller than 0.1 mm) to the curable composition, thereby providing the resulting cured product surface with a coarse feel such as a sandy or sandstone feel and, further, contributing to weight reduction. The "balloons" are spherical hollow fillers.

The balloons are not particularly restricted but include, for example, those disclosed in Japanese Kokai Publications H10-251618, H02-129262, H04-8788, H04-173867, H05-1225, H07-113073, H09-53063, 2000-154368 and 2001-164237 and WO 97/05201.

As the material of balloons, there may be mentioned inorganic materials such as glass, shirasu and silica; and organic materials such as phenol resins, urea resins, polystyrene and Saran. Mention may further be made of composite materials of an inorganic material and an organic material; and laminates comprising a plurality of layers. These may be used singly or a plurality species thereof may be used in combination.

It is also possible to use balloons subjected to surface coating treatment, treatment with various surface treatment agents or some other treatment; as typical examples, there may be mentioned organic balloons coated with calcium carbonate, talc, titanium oxide or the like, and inorganic balloons surface-treated with an adhesiveness-imparting agent.

Further, the balloons preferably have a particle diameter of not smaller than 0.1 mm, more preferably 0.2 mm to 5.0 mm, particularly preferably 0.5 mm to 5.0 mm. When the diameter is smaller than 0.1 mm, the addition even in large amounts only increases the viscosity of the composition, sometimes failing to provide the resulting cured products with a coarse feel.

The addition level of the balloons can be properly selected according to the intended decorative effect; it is preferred that balloons having a particle diameter of not smaller than 0.1 mm be added in an amount such that the volume concentration thereof in the curable composition amounts to 5 to 25% by volume, more preferably 8 to 22% by volume. When the volume concentration of balloons is below 5% by volume, the desired coarse feel tends to become lost. At level exceeding 25% by volume, the viscosity of the curable composition increases and the workability thereof tends to become poor; further, the modulus of the cured products increases and the fundamental performance characteristics of the sealant or adhesive tend to become impaired.

On the occasion of adding balloons, it is also possible to add, in combination, such an anti-slip agent as the one disclosed in Japanese Kokai Publication 2000-154368 or such an amine compound capable of rendering the resulting cured product surface uneven and matted as the one disclosed in Japanese Kokai Publication 2001-164237. Preferred as the amine compound mentioned above are primary and/or secondary amines having a melting point of 35° C. or higher.

Also usable as the balloons are thermally expandable minute hollow particles disclosed in Japanese Kokai Publication 2004-51701 or 2004-66749, for instance. The "thermally expandable minute hollow particles" are spherical plastic bodies made of a polymer shell material (vinylidene chloride type copolymer, acrylonitrile type copolymer or vinylidene chloride-acrylonitrile copolymer) with a low-boiling compound such as a hydrocarbon containing 1 to 5 carbon atoms as spherically enclosed therein.

By adding thermally expandable minute hollow particles to the curable composition of the present invention, it becomes possible to obtain, without using any organic solvent at all, a thermally removable adhesive composition which, when no more required, can be peeled off with ease only by heating without destruction of the adherend materials. This is based on the mechanism such that when the adhesive portion is heated, the gas pressure inside the shells of the thermally expandable minute hollow particles increases and the polymer shell material is softened and dramatically expanded to cause peeling at the adhesive interface.

When the curable composition of the present invention contains sealant curing particles as well, the cured products obtained can have an uneven rough surface and, thus, the decorative feature thereof can be improved. The preferred diameter, addition level, material and the like of the sealant curing particles are disclosed in Japanese Kokai Publication 2001-115142, and the diameter is preferably 0.1 mm to 1 mm, more preferably 0.2 to 0.5 mm. The addition level is preferably 5 to 100 parts by weight, more preferably 20 to 50 parts by weight, per 100 parts by weight of the curable composition. The material is not particularly restricted but may be any of the materials used in sealing compositions; thus, mention may be made of urethane resins, silicones, modified silicones and polysulfide rubbers, for example. Among those mentioned above, modified silicone type sealant curing particles are preferred.

To the curable composition of the present invention, there is added a silicate, if necessary. The silicate acts as a crosslinking agent on the polymer (A) and functions to bring about improvements in the restorability, durability and creep resistance of the cured products obtained.

Further, the addition of a silicate brings about improvements in the adhesiveness and water-resistant adhesiveness and in the bond durability under high-temperature and high-pressure conditions. The silicate is not particularly restricted but includes, for example, tetraalkoxysilanes or partial hydrolysis condensation products derived therefrom; more specifically, there may be mentioned tetraalkoxysilanes (tetraalkyl silicates) such as tetramethoxysilane, tetraethoxysilane, ethoxytrimethoxysilane, dimethoxydiethoxysilane, methoxytriethoxysilane, tetra-n-propoxysilane, tetra-i-propoxysilane, tetra-n-butoxysilane, tetra-i-butoxysilane and tetra-t-butoxysilane as well as partial hydrolysis condensation products derived therefrom.

The addition level of the silicate is preferably 0.1 to 20 parts by weight, more preferably 0.5 to 10 parts by weight, per 100 parts by weight of the polymer (A).

The tetraalkoxysilane-derived partial hydrolysis condensation product mentioned above is not particularly restricted but includes, for example, products derived from tetraalkoxysilanes by addition of water thereto to cause partial hydrolysis and condensation.

The addition of a tetraalkoxysilane-derived partial hydrolysis condensation product is preferred since such condensation product produces significant improvements in restorability, durability and creep resistance of the cured products obtained as compared with the corresponding composition containing the tetraalkoxysilane added thereto.

Commercially available as the tetraalkoxysilane-derived partial hydrolysis condensation product are, for example, Methyl Silicate 51 and Ethyl Silicate 40 (both being products of Colcoat Co., Ltd.); these can be used as additives.

For the purpose of inhibiting the surface curability of the curable composition from changing during storage, it is preferred that the silicate be selected from among those in which the silicon atom-bound hydrolyzable groups are the same as the hydrolyzable groups in the reactive silyl group occurring in the polymer (A). Thus, when the polymer (A) contains methoxysilyl groups, a methoxysilyl group-containing silicate is preferably selected and, when the polymer (A) contains ethoxysilyl groups, an ethoxysilyl group-containing silicate is preferably selected.

In the curable composition of the present invention, there is incorporated a plasticizer if necessary. The plasticizer functions as an agent for adjusting the viscosity and slump characteristics of the curable composition and adjusting the tensile strength, elongation and like mechanical characteristics of the cured products obtained.

The plasticizer is not particularly restricted but includes: phthalic acid esters such as dibutyl phthalate, diheptyl phthalate, bis(2-ethylhexyl) phthalate and butyl benzyl phthalate; nonaromatic dibasic acid esters such as dioctyl adipate, dioctyl sebacate, dibutyl sebacate and isodecyl succinate; aliphatic esters such as butyl oleate and methyl acetylricinoleate; phosphoric acid esters such as tricresyl phosphate and tributyl phosphate; trimellitic acid esters; chlorinated paraffins; hydrocarbon type oils such as alkyldiphenyls and partially hydrogenated terphenyl; process oils; and epoxy type plasticizers such as epoxidized soybean oil and benzyl epoxystearate.

Addition of a polymeric plasticizer containing a polymer component in the molecule is preferred since such addition makes it possible to maintain the initial characteristics of the cured products obtained for a long period of time and, further, improve the drying characteristics (also referred to as applicability) of an alkyd paint when it is applied to the cured products obtained.

The polymeric plasticizer is not particularly restricted but includes: vinyl polymers obtained by polymerization of vinyl monomers by various methods; polyalkylene glycol esters such as diethylene glycol dibenzoate, triethylene glycol dibenzoate and pentaerythritol esters; polyester type plasticizers derived from a dibasic acid such as sebacic acid, adipic acid, azelaic acid and phthalic acid and a dihydric alcohol such as ethylene glycol, diethylene glycol, triethylene glycol, propylene glycol and dipropylene glycol; polyether polyols such as polyethylene glycol, polypropylene glycol and polytetramethylene glycol, each having a molecular weight of not lower than 500, preferably not lower than 1000, or polyether derivatives derived from such polyether polyols by esterification or etherification of one or both hydroxyl groups therein; polystyrenes such as polystyrene and poly-α-methylstyrene; polybutadiene, polybutene, polyisobutylene, butadiene-acrylonitrile copolymers, polychloroprene and the like.

Among these polymeric plasticizers, those highly compatible with the polymer (A) are preferred and, for example, polyethers and vinyl polymers may be mentioned.

Polyethers are more preferred since they provide the curable composition with good surface curability and depth curability and cause no curing retardation after storage; more specifically, polypropylene glycol is particularly preferred.

Further, vinyl polymers are preferred since they have high compatibility with the polymer (A) and provide the resulting cured products with good weather resistance and thermal stability; among them, acrylic polymers and/or methacrylic polymers are more preferred, and such acrylic polymers as polyacrylic acid alkyl esters are particularly preferred.

While the method of producing the polyacrylic acid alkyl esters is not particularly restricted, the living radical polymerization method is preferred because of capability of their giving polymers narrow in molecular weight distribution and possibly low in viscosity, and the atom transfer radical polymerization method is more preferred. Also particularly preferred is the method called "SGO process" and disclosed in Japanese Kokai Publication 2001-207157, which comprises continuously bulk-polymerizing an acrylic acid alkyl ester type compound under high temperature and high pressure conditions.

The number average molecular weight of the polymeric plasticizer is generally 500 to 15000, preferably 800 to 10000, more preferably 1000 to 8000, particularly preferably 1000 to 5000, most preferably 1000 to 3000. When the molecular weight of the polymeric plasticizer is too low, the plasticizer may escape from the cured products obtained with the lapse of time due to heat or rainfall and, as a result, it becomes no longer possible to maintain the initial physical characteristics, staining by adhesion of dust may possibly be caused and the alkyd applicability tends to become poor. On the other hand, when the molecular weight is excessively high, the viscosity of the curable composition will increase and the workability tends to become poor.

The molecular weight distribution of the polymeric plasticizer is not particularly restricted but preferably is narrow, for example narrower than 1.80, preferably not wider than 1.70, more preferably not wider than 1.60, still more preferably not wider than 1.50, particularly preferably not wider than 1.40, most preferably not wider than 1.30.

In the case of polyether type polymers, the number average molecular weight is determined by the end-group analysis and, in the case of other polymers, it is determined by the GPC method. The molecular weight distribution (Mw/Mn) is measured by the GPC method (on the polystyrene equivalent basis).

The polymeric plasticizer may be a reactive silyl group-containing one or a silyl group-free one and, in cases where a reactive silyl group-containing polymeric plasticizer is added, the polymeric plasticizer is preferably involved in the curing reaction and thus, the plasticizer can be prevented from migrating from the cured products obtained.

The reactive silyl group-containing polymeric plasticizer is preferably a compound whose silyl group content is, on an average, not more than one, preferably not more than 0.8, per molecule. When a reactive silyl group-containing plasticizer, in particular a reactive silyl group-containing oxyalkylene polymer, is added, it is preferred that the number average molecular weight thereof be lower than that of the polymer (A) so that a satisfactory plasticizing effect may be obtained.

The plasticizer to be added may comprise a single species or a combination of a plurality of species. It is also possible to add a low-molecular-weight plasticizer and a polymeric plasticizer in combination. The plasticizer addition may also be made on the occasion of the production of the polymer (A).

When a plasticizer is added, the addition level thereof is preferably 5 to 150 parts by weight, more preferably 10 to 120 parts by weight, particularly preferably 20 to 100 parts by weight, per 100 parts by weight of the polymer (A). At addition levels lower than 5 parts by weight, there is a tendency for the plasticizing effect to be little produced and, at levels exceeding 150 parts by weight, there arises a tendency for the mechanical strength of the cured products obtained to become insufficient.

In the curable composition of the invention, there is incorporated a tackifier, if necessary. The tackifier resin is not particularly restricted provided that it is one in common use, irrespective of whether it occurs as a solid or liquid at ordinary temperature. For example, there may be mentioned styrene block copolymers, hydrogenation products derived therefrom, phenol resins, modified phenol resins (e.g. cashew oil-modified phenol resins, tall oil-modified phenol resins), terpene-phenol type resins, xylene-phenol type resins, cyclopentadiene-phenol type resins, coumarone-indene type resins, rosin type resins, rosin ester type resins, hydrogenated rosin ester type resins, xylene type resins, low-molecular-weight polystyrene type resins, styrene copolymer resins, petroleum resins (e.g. C5 hydrocarbon type resins, C9 hydrocarbon type resins, C5C9 hydrocarbon copolymer resins), hydrogenated petroleum resins, terpene type resins, DCPD resins, and petroleum resins. These may be added singly or a plurality thereof may be added in combination.

The styrene block copolymers and hydrogenation products derived therefrom mentioned above are not particularly restricted but include, for example, styrene-butadiene-styrene block copolymers (SBSs), styrene-isoprene-styrene block copolymers (SISs), styrene-ethylenebutylene-styrene block copolymers (SEBSs), styrene-ethylenepropylene-styrene block copolymers (SEPSs) and styrene-isobutylene-styrene block copolymers (SIBSs).

When a tackifier is added, the addition level thereof is preferably 5 to 1,000 parts by weight, more preferably 10 to 100 parts by weight, per 100 parts by weight of the polymer (A).

In the curable composition of the present invention, there is incorporated a solvent or diluent, if necessary. The solvent or diluent is not particularly restricted but includes, for example, aliphatic hydrocarbons, aromatic hydrocarbons, alicyclic hydrocarbons, halogenated hydrocarbons, alcohols, esters, ketones and ethers. These may be added singly or a plurality thereof may be added in combination.

When a solvent or diluent is added, the solvent or diluent preferably has a boiling point of 150° C. or higher, more preferably 200° C. or higher, so that the volatile components in the solvent or diluent may be inhibited from dissipating into the air on the occasion of indoor use of the curable composition.

In the curable composition of the present invention, there may be incorporated a physical property modifier, if necessary. The physical property modifier functions so as to adjust the tensile characteristics and hardness of the resulting cured products.

The physical property modifier is not particularly restricted but includes, for example, alkylalkoxysilanes such as methyltrimethoxysilane, dimethyldimethoxysilane, trimethylmethoxysilane and n-propyltrimethoxysilane; alkylisopropenoxysilanes such as dimethyldiisopropenoxysilane, methyltriisopropenoxysilane and γ-glycidoxypropylmethyldiisopropenoxysilane; functional group-containing alkoxysilanes such as γ-glycidoxypropylmethyldimethoxysilane, γ-glycidoxypropyltrimethoxysilane, vinyltrimethoxysilane, vinyldimethylmethoxysilane, γ-aminopropyltrimethoxysilane, N-(β-aminoethyl)aminopropylmethyldimethoxysilane, γ-mercaptopropyltrimethoxysilane and γ-mercaptopropylmethyldimethoxysilane; silicone varnishes; and polysiloxanes. These may be added singly or a plurality thereof may be added in admixture.

Among such physical property modifiers, those which form, upon hydrolysis, a compound containing a monovalent silanol group in the molecule are preferred since they are effective in reducing the modulus of the resulting cured products without worsening the surface stickiness thereof; among them, those which form, upon hydrolysis, trimethylsilanol are more preferred.

The compounds which form, upon hydrolysis, a compound containing monovalent silanol group in the molecular are not particularly restricted but include: those compounds disclosed in Japanese Kokai Publication H05-117521; compounds derived from an alkyl alcohol, such as hexanol, octanol and decanol, and capable of forming, upon hydrolysis, such an organosilicon compound represented by $R_3SiOH$ as trimethylsilanol; and those compounds disclosed in Japanese Kokai Publication H11-241029 which are compounds derived from a polyhydric alcohol containing 3 or more hydroxyl groups in each molecule, for example trimethylolpropane, glycerol, pentaerythritol or sorbitol, and capable of forming, upon hydrolysis, such an organosilicon compound represented by $R_3SiOH$ as trimethylsilanol.

Further, mention may be made of those compounds disclosed in Japanese Kokai Publication H07-258534 which are derived from an oxypropylene polymer and capable of forming, upon hydrolysis, such an organosilicon compound represented by $R_3SiOH$ as trimethylsilanol and, further, those compounds disclosed in Japanese Kokai Publication H06-279693 which contain a crosslinkable hydrolyzable silyl group and a silyl group capable of forming, upon hydrolysis, a monovalent silanol group-containing compound.

When a physical property modifier is added, the addition level thereof is preferably 0.1 to 20 parts by weight, more preferably 0.5 to 10 parts by weight, per 100 parts by weight of the polymer (A).

In the curable composition of the present invention, there is incorporated a thixotropic agent (anti-sagging agent), if necessary. The term "thixotropic agent" refers to an agent functioning to prevent the curable composition from sagging and improve the workability thereof.

The thixotropic agent is not particularly restricted but includes, for example, polyamide waxes; hydrogenated castor oil derivatives; and metal soaps such as calcium stearate, aluminum stearate and barium stearate. Further, mention may be made of those rubber powders having a particle diameter of 10 to 500 μm which are disclosed in Japanese Kokai Publication H11-349916, and those organic fibers disclosed in Japanese Kokai Publication 2003-155389. These thixotropic agents (antisagging agents) may be added singly or a plurality of species may be added in combination.

When a thixotropic agent is added, the addition level thereof is preferably 0.1 to 20 parts by weight per 100 parts by weight of the polymer (A). In the curable composition of the present invention, there is incorporated, for example, a compound containing an epoxy group in each molecular, if necessary. By adding an epoxy group-containing compound, it becomes possible to enhance the restorability of the cured products obtained.

The epoxy group-containing compound is not particularly restricted but includes, for example, epoxidized unsaturated fats and oils; epoxidized unsaturated fatty acid esters; alicyclic epoxy compounds; epichlorohydrin derivatives and like compounds; and mixtures thereof. More specifically, there may be mentioned epoxidized soybean oil, epoxidized linseed oil, bis(2-ethylhexyl)-4,5-epoxycyclohexane-1,2-dicarboxylate (E-PS), epoxyoctyl stearate, epoxybutyl stearate and the like. Among these, E-PS is preferred.

When an epoxy compound is added, the addition level thereof is preferably 0.5 to 50 parts by weight per 100 parts by weight of the polymer (A). In the curable composition of the present invention, there is added a photocurable substance, if necessary. The photocurable substance is a substance capable of undergoing, under the action of light, chemical changes in molecular structure in a short period of time which lead to changes in physical properties such as curing. The addition of a photocurable substance to the curable composition results in the formation of a photocurable substance-based layer on the surface of the cured products obtained and thus in improvements in the stickiness and weather resistance of the cured products.

The photocurable substance is not particularly restricted but includes those known in the art, such as organic monomers, oligomers, resins, and compositions containing any of them; for example, there may be mentioned unsaturated acrylic compounds, vinyl cinnamate polymers and azidized resins.

As the unsaturated acrylic compounds, there may be mentioned monomers, oligomers, or mixtures thereof, containing one or a plurality of acrylic or methacrylic unsaturated groups in each molecule, and, specifically, propylene (or butylene or ethylene) glycol di(meth)acrylate, neopentyl glycol di(meth) acrylate and like monomers or oligoesters having a molecular weight not exceeding 10,000. More specifically, there may be mentioned, for example, such special acrylates as (bifunctional) Aronix M-210, Aronix M-215, Aronix M-220, Aronix M-233, Aronix M-240 and Aronix M-245; (trifunctional) Aronix M-305, Aronix M-309, Aronix M-310, Aronix M-315, Aronix M-320 and Aronix M-325, and (polyfunctional) Aronix M-400 (all Aronix products being available from Toagosei Co., Ltd.). Among these, acrylic functional group-containing compounds are preferred, and compounds containing, on an average, 3 or more acrylic functional groups in each molecule are more preferred.

The vinyl cinnamate polymers are photosensitive resins having cinnamoyl groups as photosensitive groups, which are compounds resulting from esterification of polyvinyl alcohol with cinnamic acid, and many other derivatives of vinyl cinnamate polymers.

The azidized resins are known as photosensitive resins in which azide groups are photosensitive groups and include rubber photosensitive solutions generally containing a diazide compound added as a photosensitizer and, further, those detailed examples are described in "Kankosei Jushi (Photosensitive Resins)" (published Mar. 1, 1972 by Insatsu Gakkai Shuppanbu Ltd., p. 93 ff., p. 106 ff., and p. 117 ff.). These may be used either singly or in admixture, if necessary together with a sensitizer.

In some cases, the addition of a sensitizer such as a ketone and nitro compound or a promoter such as an amine enhances the effect.

When a photocurable substance is added, the addition level thereof is preferably 0.1 to 20 parts by weight, more preferably 0.5 to 10 parts by weight, per 100 parts by weight of the polymer (A). At levels of 0.1 part by weight or below, the effect of enhancing the weather resistance of the cured products obtained is very little and, at levels of 20 parts by weight or above, the cured products obtained are too hard, tending to undergo cracking or the like.

In the curable composition of the present invention, there is incorporated an oxygen-curable substance, if necessary. The oxygen-curable substance can be cured upon reaction with oxygen in the air, and the addition of an oxygen-curable substance makes it possible to reduce the stickiness of the cured product surface and to prevent dirt and dust from adhering to the surface through the formation of a cured layer in the vicinity of the cured product surface obtained.

The oxygen-curable substance is not particularly restricted but may be any of the compounds containing an unsaturated compound capable of reacting with oxygen in the air; thus, for example, there may be mentioned drying oils such as tung oil and linseed oil, and various alkyd resins obtained by modifying such compounds; drying oil-modified acrylic polymers, epoxy type resins and silicone type resins; liquid polymers obtained by polymerizing or copolymerizing such a diene compound(s) as butadiene, chloroprene, isoprene and 1,3-pentadiene, for example 1,2-polybutadiene, 1,4-polybutadiene and C5-C8 diene polymers; liquid copolymers obtained by copolymerizing such a diene compound with a vinyl compound, such as acrylonitrile and styrene, copolymerizable with the diene compound, in a manner such that the diene compound serve as the main component, for example NBR and SBR; and, further, various modifications thereof (maleinated modifications, boiled oil modifications, etc.). Among those mentioned above, tung oil and liquid diene type polymers are preferred. The oxygen-curable substance to be added may comprise a single species or a combination of a plurality of species.

When a catalyst and/or metal dryer which are capable of promoting the curing reaction are added in admixture with the oxygen-curable substance, the effect may be enhanced. The catalyst and metal dryer for promoting the curing reaction are not particularly restricted but include, for example, metal salts such as cobalt naphthenate, lead naphthenate, zirconium naphthenate, cobalt octylate and zirconium octylate, and amine compounds.

When an oxygen-curable substance is added, the addition level thereof is preferably 0.1 to 20 parts by weight, more preferably 0.5 to 10 parts by weight, per 100 parts by weight of the polymer (A). At addition levels below 0.1 part by weight, the effect of improving the stain resistance of the cured products obtained tends to become insufficient and, at levels exceeding 20 parts by weight, the tensile characteristics and the like of the cured products obtained tend to become impaired.

Further, the oxygen-curable substance is preferably added in admixture with a photocurable substance, as disclosed in Japanese Kokai Publication H03-160053.

In the curable composition of the present invention, there is incorporated an antioxidant, if necessary. By adding an antioxidant, it becomes possible to enhance the thermal stability of the cured products obtained.

The antioxidant is not particularly restricted but includes hindered phenol type, monophenol type, bisphenol type and polyphenol type antioxidants. Among these, hindered phenol type antioxidants are preferred. Also preferred are hindered amine type light stabilizers such as Tinuvin 622LD and Tinuvin 144; Chimassorb 944LD and Chimassorb 119FL (all four being products of Chiba Specialty Chemicals); ADK STAB LA-57, ADK STAB LA-62, ADK STAB LA-67, ADK STAB LA-63 and ADK STAB LA-68 (all five being products of Adeka Corporation); and Sanol LS-770, Sanol LS-765, Sanol LS-292, Sanol LS-2626, Sanol LS-1114 and Sanol LS-744 (all six being product of Sankyo Lifetech Co., Ltd.). Specific examples of the antioxidants are disclosed also in Japanese Kokai Publications H04-283259 and H09-194731.

When an antioxidant is added, the addition level thereof is preferably 0.1 to 10 parts by weight, more preferably 0.2 to 5 parts by weight, per 100 parts by weight of the polymer (A).

In the curable composition of the present invention, there is incorporated a light stabilizer, if necessary. By adding a light stabilizer, the cured products obtained can be prevented from undergoing photooxidative degradation.

The light stabilizer is not particularly restricted but includes benzotriazole type, hindered amine type and benzoate type compounds. Among these, hindered amine type light stabilizers are preferred.

When a light stabilizer is added, the addition level thereof is preferably 0.1 to 10 parts by weight, more preferably 0.2 to 5 parts by weight, per 100 parts by weight of the polymer (A). A specific example of the light stabilizer is disclosed in Japanese Kokai Publication H09-194731 as well.

When such a photocurable substance as an unsaturated acrylic compound is added to the curable composition of the present invention, a tertiary amine group-containing hindered amine type light stabilizer is preferably added as disclosed in Japanese Kokai Publication H05-70531 since, then, the storage stability of the curable composition is improved.

The tertiary amine group-containing hindered amine type light stabilizer is not particularly restricted but includes Tinuvin 622LD, Tinuvin 144 and Chimassorb 119FL (all three being products of Ciba Specialty Chemicals Inc.); ADK STAB LA-57, LA-62, LA-67 and LA-63 (all four being products of Adeka Corporation); and Sanol LS-765, LS-292, LS-2626, LS-1114 and LS-744 (all five being products of Sankyo Lifetech Co., Ltd.).

To the curable composition of the present invention is added an ultraviolet absorber, if necessary. When an ultraviolet absorber is added to the curable composition, the surface weather resistance of the cured products obtained is improved.

The ultraviolet absorber is not particularly restricted but includes benzophenone type, benzotriazole type, salicylate type, substituted tolyl type and metal chelate type compounds.

Among these, benzotriazole type ultraviolet absorbers are preferred.

When an ultraviolet absorber is added to the curable composition, the addition level thereof is preferably 0.1 to 10 parts by weight, more preferably 0.2 to 5 parts by weight, per 100 parts by weight of the polymer (A).

The antioxidant, light stabilizer and ultraviolet absorber mentioned above are preferably added in combination to the curable composition and, for example, a phenol or hindered phenol antioxidant, a hindered amine type light stabilizer and a benzotriazole type ultraviolet absorber are preferably added in admixture with the curable composition.

To the curable composition of the present invention is added a flame retardant, if necessary. The flame retardant is not particularly restricted; thus, for example, phosphorus type flame retardants such as ammonium polyphosphate and tricresyl phosphate; aluminum hydroxide, magnesium hydroxide, and flame retardants such as thermally expandable graphite are added to the curable composition. The flame retardant to be added thereto may comprise a single species or a combination of a plurality of species.

The addition level of the flame retardant is preferably to 200 parts by weight, more preferably 10 to 100 parts by weight, per 100 parts by weight of the polymer (A).

To the curable composition of the present invention may be added, if necessary, various additives other than those mentioned above for the purpose of adjusting various physical properties of the curable composition or of the cured products to be obtained. As such additives, there may be mentioned, for example, curability modifiers, radical inhibitors, metal deactivators, antiozonants, phosphorus type peroxide decomposers, lubricants, pigments, blowing agents, antitermites and antifungal agents. Specific examples of these are disclosed in publications such as Japanese Kokoku Publications H04-69659 and H07-108928, and Japanese Kokai Publications S63-254149, S64-22904 and 2001-72854. These additives may be added singly to the curable composition or a plurality thereof may be added in combination to the curable composition.

In the composition of the invention, there may be used a solvent for the purpose of reducing the viscosity, enhancing the thixotropic property and improving the workability of the composition. The solvent is not particularly restricted but various compounds can be used. As specific examples, there may be mentioned hydrocarbon type solvents such as toluene, xylene, heptanes, hexane and petroleum-derived solvents, halogenated type solvents such as trichloroethylene, ester type solvents such as ethyl acetate and butyl acetate, ketone type solvents such as acetone, methyl ethyl ketone and methyl isobutyl ketone, alcohol type solvents such as methanol, ethanol and isopropyl alcohol, and silicone solvents such as hexamethylcyclotrisiloxane, octamethylcyclotetrasiloxane and decamethylcyclopentasiloxane. These solvents may be used singly or two or more of them may be used in combination.

However, in cases where the solvent addition level is high, the toxicity to human bodies may become high in certain cases and volume shrinkages may be found in cured products in some instances. Therefore, when a solvent is added, the addition level thereof is preferably not higher than 3 parts by weight, more preferably not higher than 1 part by weight, per 100 parts by weight of the (A) component organic polymer; it is most preferred that substantially no solvent is present.

As regards the method of preparing the curable composition of the invention, both the one-pack type and two-pack type may be employed. From the good workability viewpoint, the one-pack type preparation method is preferred. The one-pack type preparation method comprises compounding all the formulation components in advance and storing the composition in a tightly closed vessel; after application, the composition is cured by the moisture in the air. The two-pack preparation method comprises separately preparing a curing formulation comprising such ingredients as the curing catalyst, filler, plasticizer and water; prior to application, the curing formulation and the polymer composition are mixed together.

In cases where the curable composition is of the one-pack type, the composition contains all components as mixed up in advance and, thus, curing may proceed during storage if moisture is present in formulation components. Therefore, those formulation components which contain moisture are preferably dehydrated and dried prior to addition or dehydrated during compounding and kneading by reducing the pressure, for instance.

When the curable composition is of the two-pack type, it is not necessary to incorporate the curing catalyst in the main component having a reactive silyl group-containing polymer and, therefore, even if some moisture is contained in the formulation components, the risk of the progress of curing (gelation) is low; in cases where long-term storage stability is required, however, it is preferred that the formulation components be dehydrated or dried.

As for the method of dehydrating or drying, the method comprising drying by heating or the method comprising dehydrating under reduced pressure are preferred in cases where the formulation components are solids such as powders and, in cases where they are liquids, the vacuum dehydration method and the dehydration method using a synthetic zeolite, activated alumina, silica gel, quick lime, magnesium oxide or the like are preferred and, further, the dehydration method comprising adding an alkoxysilane compound such as n-propyltrimethoxysilane, vinyltrimethoxysilane, vinylmethyldimethoxysilane, methyl silicate, ethyl silicate, γ-mercpatopropylmethyldimethoxysilane, γ-mercaptopropylmethyldiethoxysilane and γ-glycidoxypropyltrimethoxysilane; an oxazolidine compound such as 3-ethyl-2-methyl-2-(3-methylbutyl)-1,3-oxazolidine; and an isocyanate compound to the curable composition and allowing the same to react with water contained in the formulation components is also preferred. In this way, the storage stability of the curable composition is improved by the addition of such an alkoxysilane compound, oxazolidine compound and isocyanate compound.

In using vinyltrimethoxysilane or a like alkoxysilane compound capable of reacting with water for the purpose of drying, the addition level thereof is preferably 0.1 to 20 parts by weight, more preferably 0.5 to 10 parts by weight, per 100 parts by weight of the polymer (A).

The method of preparing the curable composition of the present invention is not particularly restricted but there may be employed, for example, such a method known in the art as a method comprising combining the formulation components mentioned above and kneading the resulting mixture at ordinary temperature or with heating using a mixer, roller, kneader, or the like, or a method comprising dissolving the formulation components using small portions of an appropriate solvent and then mixing up the solutions.

When exposed to the air, the curable composition of the present invention forms a three-dimensional network structure under the action of atmospheric moisture and thus is cured to give a solid having rubber elasticity.

The curable composition of the present invention can be suitably used in such fields of application as pressure-sensitive adhesives; sealants for buildings, ships, automobiles, roads, etc.; adhesives; impression materials; vibration-proof materials; damping materials; soundproof materials; expanded/foamed materials; coating compositions; spray coatings, etc. Among such fields of application, the use as sealants or adhesives is more preferred since the cured products obtained are excellent in flexibility and adhesiveness.

The curable composition of the present invention can also be used in such fields of application as back cover sealants for a solar cell and like electric and electronic part materials; insulating cover materials for electric wires and cables and other electric insulating materials; elastic adhesives; contact adhesives; spray sealants; crack repair materials; tiling adhesives; powder coating compositions; casting materials; rubber materials for medical use; pressure-sensitive adhesives for medical use; sealants for medical devices; food packaging materials; joint sealants for siding boards and other exterior materials; coating materials; primers; electromagnetic wave shielding conductive materials, thermally conductive materials; hot melt materials; potting agents for electrics and electronics; films; gaskets; various molding materials; rustproof and waterproof sealants for wired glass and laminated-glass edges (cut end faces); liquid sealants for use in automotive parts, electrical machinery parts, various machinery parts, etc.

Further, the curable composition can also be used as various types of hermetically sealants and adhesives since it, either alone or with the aid of a primer, can adhere to a wide range of substrates such as glass, ceramics, wood, metals and resin moldings.

The curable composition of the present invention can also be used in the form of interior panel adhesives, exterior panel adhesives, tiling adhesives, stone pitching adhesives, ceiling finishing adhesives, floor finishing adhesives, wall finishing adhesives, vehicle panel adhesives, electric, electronic and precision apparatus assembling adhesives, direct glazing sealants, double glazing sealants, sealants for SSG systems, or building working joint sealants.

BEST MODE FOR CARRYING OUT THE INVENTION

The following examples and comparative examples illustrate the present invention more specifically. These are, however, by no means limitative of the scope of the present invention.

Synthesis Example 1

Propylene oxide was polymerized using polyoxypropylene triol with a molecular weight of about 3,000 as an initiator and a zinc hexacyanocobaltate glyme complex catalyst to give polypropylene oxide having a number average molecular weight of about 26,000 (polystyrene-equivalent value measured by using a TOSOH model HLC-8120 GPC solvent delivery system, a TOSOH model TSK-GEL H type column, with THF as a solvent). Thereto was then added a methanol solution of NaOMe in an amount of 1.2 equivalents relative to the hydroxyl groups of that hydroxyl-terminated polypropylene oxide, the methanol was distilled off and, further, allyl chloride was added to the residue for conversion of each terminal hydroxyl group to an allyl group. The unreacted allyl chloride was removed by volatilization under reduced pressure. To 100 parts by weight of the crude allyl-terminated polypropylene oxide obtained were added 300 parts by weight of n-hexane and 300 parts by weight of water and, after mixing with stirring, the water was removed by centrifugation. The hexane solution obtained was further mixed with 300 parts by weight of water with stirring, and after the water was removed again by centrifugation, the hexane was removed by volatilization under reduced pressure. In the above manner, allyl-terminated trifunctional polypropylene oxide with a number average molecular weight of about 26,000 was obtained (P-1).

The allyl group-terminated polypropylene oxide (P-1) (100 parts by weight) was reacted with 1.3 parts by weight of trimethoxysilane at 90° C. for 5 hours by adding 150 ppm of an isopropanol solution of a platinum-vinylsiloxane complex (platinum content: 3% by weight) thereto as a catalyst to give a trimethoxysilyl group-terminated polypropylene oxide (A-1). As a result of $^1$H-NMR measurement (made in CDCl$_3$ solvent using a Nippon Denshi (JEOL Ltd.) model JNM-LA400), the average number of terminal methyldimethoxysilyl groups per molecule was found to be 2.0.

Synthesis Example 2

Using polyoxypropylene diol with a molecular weight of about 2,000 as an initiator, propylene oxide was polymerized in the presence of a zinc hexacyanocobaltate-glyme complex catalyst to give polypropylene oxide with a number average molecular weight of about 25,500 (polystyrene equivalent value measured in the same manner as in Synthesis Example 1). To this hydroxyl group-terminated polypropylene oxide was then added a methanol solution of NaOMe in an amount of 1.2 equivalents relative to the hydroxyl groups in the polymer, the methanol was distilled off and, further, allyl chloride was added to convert the terminal hydroxyl groups to allyl groups. The unreacted allyl chloride was removed by volatilization under reduced pressure.

To 100 parts by weight of the crude allyl-terminated polypropylene oxide obtained were added 300 parts by weight of n-hexane and 300 parts by weight of water and, after mixing with stirring, the water was removed by centrifugation. The hexane solution obtained was further mixed with 300 parts by weight of water with stirring, and after the water was removed again by centrifugation, the hexane was removed by volatilization under reduced pressure. In the above manner, allyl-terminated bifunctional polypropylene oxide (P-2) with a number average molecular weight of about 25,500 was obtained.

The allyl group-terminated polypropylene oxide (P-2) (100 parts by weight) was reacted with 0.95 part by weight of trimethoxysilane at 90° C. for 5 hours by adding 150 ppm of an isopropanol solution of a platinum-vinylsiloxane complex (platinum content: 3% by weight) thereto as a catalyst to give a trimethoxysilyl group-terminated polypropylene oxide (A-2). As a result of $^1$H-NMR measurement, the average number of terminal methyldimethoxysilyl groups per molecule was found to be about 1.3.

Synthesis Example 3

The allyl group-terminated polypropylene oxide (P-2) obtained in Synthesis Example 2 (100 parts by weight) was reacted with 2.2 parts by weight of 1-[2-(trimethoxysilyl)ethyl]-1,1,3,3-tetramethyldisiloxane at 90° C. for 5 hours by adding 150 ppm of an isopropanol solution of a platinum-vinylsiloxane complex (platinum content: 3% by weight) thereto as a catalyst to give a trimethoxysilyl group-terminated polyoxypropylene type polymer (A-3). As a result of $^1$H-NMR measurement, the average number of terminal trimethoxysilyl groups per molecule was found to be about 1.3.

Synthesis Example 4

The allyl group-terminated polypropylene oxide (P-2) obtained in Synthesis Example 2 (100 parts by weight) was reacted with 1.3 parts by weight of triethoxysilane at 90° C. for 5 hours by adding 150 ppm of an isopropanol solution of a platinum-vinylsiloxane complex (platinum content: 3% by weight) thereto as a catalyst to give a triethoxysilyl group-terminated polyoxypropylene type polymer (A-4). As a result of $^1$H-NMR measurement, the average number of terminal triethoxysilyl groups per molecule was found to be about 1.3.

Synthesis Example 5

The allyl group-terminated polypropylene oxide (P-2) obtained in Synthesis Example 2 (100 parts by weight) was reacted with 0.8 parts by weight of methyldimethoxysilane at 90° C. for 5 hours by adding 150 ppm of an isopropanol solution of a platinum-vinylsiloxane complex (platinum content: 3% by weight) thereto as a catalyst to give a methyldimethoxysilyl group-terminated polyoxypropylene type polymer (A-5). As a result of $^1$H-NMR measurement, the average number of terminal methyldimethoxysilyl groups per molecule was found to be about 1.3.

Synthesis Example 6

Propylene oxide was polymerized using a 1/1 (in weight ratio) mixture of polyoxypropylene diol with a molecular weight of about 2,000 and polyoxypropylenetriol with a molecular weight of about 3,000 as an initiator in the presence of a zinc hexacyanocobaltate glyme complex catalyst to give polypropylene oxide having a number average molecular weight of about 19,000 (polystyrene equivalent molecular weight measured in the same manner as in Synthesis Example 1). Thereto was then added a methanol solution of NaOMe in an amount of 1.2 equivalents relative to the hydroxyl groups of that hydroxyl-terminated polypropylene oxide, the methanol was distilled off and, further, allyl chloride was added to the residue for conversion of each terminal hydroxyl group to an allyl group. To 100 parts by weight of the crude allyl-terminated polypropylene oxide obtained were added 300 parts by weight of n-hexane and 300 parts by weight of water and, after mixing with stirring, the water was removed by centrifugation. The hexane solution obtained was further mixed with 300 parts by weight of water with stirring, and after the water was removed again by centrifugation, the hexane was removed by volatilization under reduced pressure to give purified allyl group-terminated polypropylene oxide. In the above manner, allyl group-terminated polypropylene oxide with a number average molecular weight of about 19,000 was obtained (P-3).

The allyl group-terminated polypropylene oxide (P-3) obtained (100 parts by weight) was reacted with 1.4 parts by weight of methyldimethoxysilane at 90° C. for 5 hours by adding 150 ppm of an isopropanol solution of a platinum-vinylsiloxane complex (platinum content: 3% by weight) thereto as a catalyst to give a methyldimethoxysilyl group-terminated polyoxypropylene type polymer (A-6). As a result of $^1$H-NMR measurement, the average number of terminal methyldimethoxysilyl groups per molecule was found to be about 1.7.

Synthesis Example 7

To 100 parts by weight of polyoxypropylene diol with a molecular weight of about 12,200 was added 2.7 parts by weight of γ-isocyanatopropyltrimethoxysilane, and the reaction was allowed to proceed at 90° C. for 5 hours to give a trimethoxysilyl group-terminated polyoxypropylene type polymer (A-7). As a result of $^1$H-NMR measurement, the average number of terminal trimethoxysilyl groups per molecule was found to be 1.6.

Synthesis Example 8

Into a flask were put 66 g of n-butyl acrylate, 14.5 g of methyl methacrylate, 15 g of stearyl methacrylate, 4.5 g of 3-methacryloxypropyltrimethoxysilane and 23.0 g of isobutanol, and 1.3 g of azobisisobutyronitrile was dissolved therein as a polymerization initiator to prepare a mixture solution. Isobutanol (44 g) was put into a separable flask provided with a stirrer, thermometer, and nitrogen introducing port and heated to 105° C. Then, nitrogen was subjected to bubbling, and after the air inside the flask system was substituted by nitrogen, the above monomer solution was dropped for 4 hours; 2 hours later, post-polymerization was carried out to give trimethoxysilyl group-containing methacryl type polymer (A-8).

Trimethoxysilyl group-containing methacryl type polymer (A-8) obtained was an isobutanol solution having 60% of solid concentration and the number average molecular weight was about 11,000 (polystyrene-equivalent value measured in the same manner as in Synthesis Example 1). As calculated from the put amount and the average molecular weight of 3-methacryloxypropyltrimethoxysilane, the introduction number of trimethoxysilyl in the trimethoxysilyl group-containing methacryl type polymer (A-8) per molecule was found to be 2.0.

Synthesis Example 9

To 150 g of o-toluidine (product of Tokyo Chemical Industry) was added 109 g of a 35 to 37% aqueous solution of hydrochloric acid (product of Wako Pure Chemical Industries) and, after heating to 85° C., 128 g of a 50% aqueous solution of cyanamide (product of Sigma-Aldrich Corp.) was added dropwise. After completion of the dropping of the aqueous cyanamide solution, a further 26.8-g portion of the aqueous hydrochloric acid was immediately added, and the mixture was stirred at 85° C. for 2 hours. The reaction mixture was cooled to room temperature and then neutralized with 236 g of a 50% aqueous solution of potassium hydroxide (product of Wako Pure Chemical Industries) to give 1-(o-tolyl)guanidine.

Preparation of 1-phenylguanidine Solution (I)

To 100 parts by weight of 1-phenylguanidine (product of Nippon Carbide Industries) was added 20 parts by weight of methanol. After mixing up, a yellow and transparent 1-phenylguanidine solution (I) was obtained.

Preparation of 1-phenylguanidine Solution (II)

To 100 parts by weight of 1-phenylguanidine was added 150 parts by weight of polyoxypropylene diol with a molecular weight of 3000 (product of Mitsui Takeda Chemicals, trade name: Actcol P-23). After mixing up and 1 hour of standing in a drier at 80° C., a yellow and transparent 1-phenylguanidine solution (II) was obtained.

Preparation of 1-(o-tolyl)guanidine solution (I)

To 100 parts by weight of 1-(o-tolyl)guanidine obtained in Synthesis Example 9 was added 50 parts by weight of methanol. After mixing up, a yellow and transparent 1-(o-tolyl)guanidine solution (I) was obtained.

Preparation of 1-(o-tolyl)guanidine Solution (II)

To 100 parts by weight of 1-(o-tolyl)guanidine obtained in Synthesis Example 9 was added 150 parts by weight of polyoxypropylene diol with a molecular weight of 3000. After mixing up and 1 hour of standing in a drier at 80° C., a yellow and transparent 1-(o-tolyl)guanidine solution (II) was obtained.

Preparation of 1-(o-tolyl)biguanide Solution

To 100 parts by weight of 1-(o-tolyl)biguanide (product of Tokyo Chemical Industry) was added 400 parts by weight of methanol. After mixing up and 1 hour of standing in a drier at 50° C., a colorless and transparent 1-(o-tolyl)biguanide solution was obtained.

Preparation of 1,3-diphenyl Guanidine Solution

To 100 parts by weight of 1,3-diphenyl guanidine (product of Tokyo Chemical Industry) was added 400 parts by weight of methanol. After mixing up and 1 hour of standing in a drier at 50° C., a colorless and transparent 1,3-diphenyl guanidine solution was obtained.

Example 1

A curable composition was prepared by adding 3 parts by weight of the 1-phenylguanidine solution (I) as a silanol condensation catalyst to 100 parts by weight of the trimethoxysilyl group-terminated polypropylene oxide (A-1) obtained in Synthesis Example 1 and kneading the mixture using a spatula for 2 minutes.

Example 2

A curable composition was obtained in the same manner as in Example 1 except that the 1-phenylguanidine solution (I) was used in an amount of 5 parts by weight.

Example 3

A curable composition was obtained in the same manner as in Example 1 except that 4.4 parts by weight of 1-(o-tolyl)guanidine solution (I) was used in lieu of the 1-phenylguanidine solution (I) used in Example 1.

Comparative Example 1

A curable composition was obtained in the same manner as in Example 1 except that 3 parts by weight of 1-(o-tolyl)biguanide was used in lieu of the 1-phenylguanidine solution (I) used in Example 1.

Comparative Example 2

A curable composition was obtained in the same manner as in Comparative Example 1 except that the 1-(o-tolyl)biguanide was used in an amount of 5 parts by weight.

Comparative Example 3

A curable composition was obtained in the same manner as in Example 1 except that 15 parts by weight of 1-(o-tolyl)biguanide solution was used in lieu of the 1-phenylguanidine solution (I) used in Example 1.

Comparative Example 4

A curable composition was obtained in the same manner as in Example 1 except that 10 parts by weight of 1,3-diphenylguanidine solution was used in lieu of the 1-phenylguanidine solution (I) used in Example 1.

Comparative Example 5

A curable composition was obtained in the same manner as in Comparative Example 4 except that the 1,3-diphenylguanidine solution was used in an amount of 30 parts by weight.

(Surface Curability)

Under conditions of 23° C. and 50% RH, each of the above curable compositions was left at rest, and the surface of the curable composition was touched gently with a microspatula from time to time and the time required for the composition to become no more sticking to the microspatula was determined. In practical use, shorter time for the composition to become no more sticking to the microspatula indicates more rapid curing and more excellent curability of the curable composition.

TABLE 1

| | | | Examples | | | Comparative Examples | | | | |
|---|---|---|---|---|---|---|---|---|---|---|
| | | | 1 | 2 | 3 | 1 | 2 | 3 | 4 | 5 |
| Organic polymer (A) | | A-1 | 100 | 100 | 100 | 100 | 100 | 100 | 100 | 100 |
| Amine compound | Guanidine compound (B) | 1-phenylguanidine solution (I) | 3 | 5 | | | | | | |
| | | 1-(o-tolyl)guanidine solution (I) | | | 4.4 | | | | | |
| | | 1-(o-tolyl)biguanide | | | | 3 | 5 | | | |
| | | 1-(o-tolyl)biguanide solution | | | | | | 15 | | |
| | | 1,3-diphenylguanidine solution | | | | | | | 10 | 30 |
| Surface curability | | | 15 minutes | 7 minutes | 16 minutes | 52 minutes | 42 minutes | 28 minutes | 24 hours or more | 4 to 18 hours |

As is evident from Table 1, rapid curing was observed in Examples 1 to 3 in which 1-phenylguanidine or 1-(o-tolyl)guanidine was used as the silanol condensation catalyst. On the other hand, slow curing was observed in Comparative Examples 1 to 5 in which 1-(o-tolyl)biguanide or 1,3-diphenylguanidine was used.

Example 4

To 100 parts by weight of the trimethoxysilyl group-terminated polypropylene oxide (A-2) obtained in Synthesis Example 2 were weighed and added 50 parts by weight of surface-treated colloidal calcium carbonate (product of Shiraishi Kogyo, trade name: Hakuenka CCR), 50 parts by weight of heavy calcium carbonate (product of Shiraishi Calcium, trade name: Whiton SB), and 2 parts by weight of an antisagging agent (product of Kusumoto Chemicals, trade name: Disparlon 6500). After thorough kneading, the mixture was passed through a three-roll paint mill for dispersion and dehydrated at 120° C. for 2 hours under reduced pressure; thus, a main composition was prepared.

Under conditions of 23° C. and 50% RH, to the main composition was added 1.5 parts by weight of 1-phenylguanidine solution (I) as the silanol condensation catalyst, and then kneaded with a spatula for 2 minutes to give a curable composition.

Example 5

A curable composition was obtained in the same manner as in Example 4 except that the 1-phenylguanidine solution (I) was used in an amount of 3 parts by weight.

Comparative Example 6

A curable composition was obtained in the same manner as in Example 4 except that 3 parts by weight of 1-(o-tolyl)biguanide was used in lieu of the 1-phenylguanidine solution (I) used in Example 4.

Comparative Example 7

A curable composition was obtained in the same manner as in Comparative Example 6 except that the 1-(o-tolyl)biguanide was used in an amount of 5 parts by weight.

Comparative Example 8

A curable composition was obtained in the same manner as in Example 4 except that 30 parts by weight of 1,3-diphenylguanidine solution was used in lieu of the 1-phenylguanidine solution (I) used in Example 4.

(Surface Curability)

Under conditions of 23° C. and 50% RH, each of the above curable compositions was spread to a thickness of about 3 mm with a spatula, and the surface of the curable composition was touched gently with a microspatula from time to time and the time required for the composition to become no more sticking to the microspatula was determined. The results thus obtained are shown in Table 1. In practical use, shorter time for the composition to become no more sticking to the microspatula indicates more rapid curing and more excellent surface curability.

TABLE 2

| | | | Examples | | Comparative Examples | | |
|---|---|---|---|---|---|---|---|
| | | | 4 | 5 | 6 | 7 | 8 |
| Main composition | Organic polymer (A) | A-2 | 100 | 100 | 100 | 100 | 100 |
| | Calcium carbonate | Hakuenka OCR | 50 | 50 | 50 | 50 | 50 |
| | | Whiton SB | 50 | 50 | 50 | 50 | 50 |
| | Antisagging agent | Disparlon 6500 | 2 | 2 | 2 | 2 | 2 |
| Amine compound | Guanidine compound (B) | 1-phenylguanidine solution (I) | 1.5 | 3 | | | |
| | | 1-(o-tolyl)biguanide | | | 3 | 5 | |
| | | 1,3-diphenylguanidine solution | | | | | 30 |
| Surface curability | | | 23 minutes | 11 minutes | 47 minutes | 35 minutes | 3 to 18 hours |

As is evident from Table 2, rapid curing was observed in Examples 4 and 5 in which 1-phenylguanidine was used as the silanol condensation catalyst. On the other hand, slow curing was observed in Comparative Examples 6 to 8 in which 1-(o-tolyl)biguanide or 1,3-diphenylguanidine was used.

Example 6

Surface-treated colloidal calcium carbonate (120 parts by weight; product of Shiraishi Kogyo, trade name: Hakuenka CCR), 55 parts by weight of a polypropylene glycol type plasticizer with a molecular weight of 3,000 (product of Mitsui Takeda Chemicals, trade name: Actcol P-23), 20 parts by weight of titanium oxide (white pigment) (product of Ishihara Sangyo, trade name: Tipaque R-820), 2 parts by weight of an antisagging agent (product of Kusumoto Chemicals Ltd., trade name: Disparlon 6500), 1 part by weight of a benzotriazole type ultraviolet absorber (product of Ciba Specialty Chemicals, trade name: Tinuvin 327) and 1 part by weight of a hindered amine type light stabilizer (product of Sankyo Lifetech, trade name: Sanol LS-770) were weighed and admixed with 100 parts by weight of the trimethoxysilyl group-terminated polypropylene oxide (A-2) obtained in Synthesis Example 2 and, after thorough kneading, the mixture was passed through a three-roll paint mill for dispersion. Thereafter, the mixture was dehydrated at 120° C. for 2 hours under reduced pressure and, after cooling to a temperature not higher than 50° C., 5 parts by weight of γ-aminopropyltrimethoxysilane (product of Dow Corning Toray Co., Ltd., trade name: A-1110), 3 parts by weight of γ-glycidoxypropyltrimethoxysilane (product of Dow Corning Toray Co., Ltd., trade name: A-187), each as an adhesiveness-imparting agent, and 3.4 parts by weight of 1-phenylguanidine solution (I), as a silanol condensation catalyst were added. After kneading under substantially water-free conditions, the resulting mixture was hermetically packed in a moisture-proof container. A one-pack type curable composition was thus obtained.

Example 7

A one-pack type curable composition was obtained in the same manner as in Example 6 except that Actcol P-23 was used in an amount of 49.8 parts by weight, 1 part by weight of benzoate type ultraviolet absorber (product of Sumika Chemtex, trade name: Sumisorb 400) was used in lieu of Tinuvin 327, 2 parts by weight of vinyltrimethoxysilane (product of Dow Corning Toray Co., Ltd., trade name: A-171) and 3 parts by weight of γ-(2-aminoethyl)-aminopropyltrimethoxysilane (product of Dow Corning Toray Co., Ltd., trade name: A-1120) were used in lieu of A-1110 and A-187, and 5.3 parts by weight of 1-phenylguanidine solution (II) was used in lieu of 1-phenylguanidine solution (I).

Example 8

A one-pack type curable composition was obtained in the same manner as in Example 7 except that an organic polymer (A-3) was used in lieu of the organic polymer (A-2) used in Example 7.

Example 9

A one-pack type curable composition was obtained in the same manner as in Example 7 except that Actcol P-23 was used in an amount of 40 parts by weight, 1-phenylguanidine solution (II) was used in an amount of 25 parts by weight, an organic polymer (A-4) was used in lieu of the organic polymer (A-2), and 6.6 parts by weight of γ-aminopropyltriethoxysilane (product of Dow Corning Toray Co., Ltd., trade name: A-1100) and 3.8 parts by weight of γ-glycidoxypropyltriethoxysilane (product of Shin-Etsu Chemical, trade name: KBE-403) were used in lieu of A-171 and A-1120.

Example 10

A one-pack type curable composition was obtained in the same manner as in Example 7 except that Actcol P-23 was used in an amount of 40 parts by weight, 1-phenylguanidine solution (II) was used in an amount of 25 parts by weight, and an organic polymer (A-5) was used in lieu of the organic polymer (A-2).

Example 11

A one-pack type curable composition was obtained in the same manner as in Example 7 except that Actcol P-23 was used in an amount of 43 parts by weight, 1-phenylguanidine solution (II) was used in an amount of 20 parts by weight, and an organic polymer (A-6) was used in lieu of the organic polymer (A-2).

Example 12

A one-pack type curable composition was obtained in the same manner as in Example 10 except that Actcol P-23 was used in an amount of 49 parts by weight, 1-phenylguanidine solution (II) was used in an amount of 10 parts by weight, the organic polymer (A-5) was used in an amount of 70 parts by weight, and an organic polymer (A-1) was used in an amount of 30 parts by weight.

Example 13

A one-pack type curable composition was obtained in the same manner as in Example 11 except that Actcol P-23 was used in an amount of 49 parts by weight, 1-phenylguanidine solution (II) was used in an amount of 10 parts by weight, the organic polymer (A-6) was used in an amount of 70 parts by weight, and the organic polymer (A-1) was used in an amount of 30 parts by weight.

Example 14

A one-pack type curable composition was obtained in the same manner as in Example 13 except that Actcol P-23 was used in an amount of 46 parts by weight, 1-phenylguanidine solution (II) was used in an amount of 15 parts by weight, the organic polymer (A-6) was used in an amount of 80 parts by weight, and the organic polymer (A-1) was used in an amount of 20 parts by weight.

Example 15

A one-pack type curable composition was obtained in the same manner as in Example 14 except that the organic polymer (A-6) was used in an amount of 90 parts by weight, and the organic polymer (A-1) was used in an amount of 10 parts by weight.

Example 16

A one-pack type curable composition was obtained in the same manner as in Example 15 except that an organic polymer (A-7) was used in lieu of the organic polymer (A-1) used in Example 15.

Example 17

A one-pack type curable composition was obtained in the same manner as in Example 15 except that an organic polymer (A-8) was used in lieu of the organic polymer (A-1) used in Example 15.

Example 18

A one-pack type curable composition was obtained in the same manner as in Example 11 except that Actcol P-23 was used in an amount of 45.1 parts by weight, and 16.5 parts by weight of 1-(o-tolyl)guanidine solution was used in lieu of 1-phenylguanidine solution (I).

Comparative Example 9

A one-pack type curable composition was obtained in the same manner as in Example 6 except that 4 parts by weight of 1-(o-tolyl)biguanide was used in lieu of 1-phenylguanidine solution (I).

Comparative Example 10

A one-pack type curable composition was obtained in the same manner as in Comparative Example 9 except that 1-(o-tolyl) biguanide was used in an amount of 10 parts by weight, and an organic polymer (A-5) was used in lieu of the organic polymer (A-2) used in Comparative Example 9.

Comparative Example 11

A one-pack type curable composition was obtained in the same manner as in Example 11 except that Sumisorb 400 was used in lieu of Tinuvin 327, and 10 parts by weight of 1-(o-tolyl)biguanide was used in lieu of 1-phenylguanidine solution (I).

Comparative Example 12

A one-pack type curable composition was obtained in the same manner as in Example 6 except that Sumisorb 400 was used in lieu of Tinuvin 327, and 9 parts by weight of 1,1,3,3-tetramethylguanidine was used in lieu of 1-phenylguanidine solution (I).

(Surface Curability)

Under conditions of 23° C. and 50% RH, each of the above curable compositions was spread to a thickness of about 3 mm with a spatula, and the surface of the curable composition was touched gently with a microspatula from time to time and the time required for the composition to become no more sticking to the microspatula was determined. The results thus obtained are shown in Table 1. In practical use, shorter time for the composition to become no more sticking to the microspatula indicates more rapid curing and more excellent surface curability of the curable composition.

(Depth Curability)

Under conditions of 23° C. and 50% RH, each of the above curable compositions was packed into a polyethylene tube with a diameter of 12 mm without allowing entrance of bubbles, and the excess was scraped away with a spatula to make the surface level to give a test sample. The test sample was allowed to stand under the same conditions for 1 day, the cured surface layer portion was then stripped off and, after removing the uncured portion thoroughly, the cured thickness was measured using vernier calipers. In practical use, thicker cured portion indicates more rapid curing and more excellent depth curability.

(Adhesiveness and Water-Resistant Adhesiveness)

Under conditions of 23° C. and 50% RH, each of the above curable compositions, in the form of a rectangle having an approximate size of 30 mm in length, 15 mm in width and 10 mm in thickness, was brought into close contact with an adherend substrate (anodic oxidation aluminum, steel plate and stainless steel) and left under the same conditions for 7 days; then, the adhesiveness was evaluated by 90-degree hand peel test.

Further, each of the above curable compositions which was brought into close contact with an adherend substrate was left under conditions of 23° C. and 50% RH for 7 days and then soaked in water at 50° C. for 7 days; then, the water-resistant adhesiveness was evaluated by 90-degree hand peel test. The adhesiveness evaluation was made in terms of fracture mode. In the case of 70 to 100% cohesive failure, the adhesiveness was evaluated as A; in the case of 30% to below 70% cohesive failure, as B; and in the case of 0% to below 30% cohesive failure, as C. In practical use, higher cohesive failure indicates excellent adhesiveness and water-resistant adhesiveness.

TABLE 3

| | | Examples | | | | | | | | |
|---|---|---|---|---|---|---|---|---|---|---|
| | | 6 | 7 | 8 | 9 | 10 | 11 | 12 | 13 | 14 |
| Organic polymer (A) | A-1 | | | | | | | 30 | 30 | 20 |
| | A-2 | 100 | 100 | | | | | | | |
| | A-3 | | | 100 | | | | | | |
| | A-4 | | | | 100 | | | | | |
| | A-5 | | | | | 100 | | 70 | | |
| | A-6 | | | | | | 100 | | 70 | 80 |
| | A-7 | | | | | | | | | |
| | A-8 | | | | | | | | | |
| Calcium carbonate | Hakuenka OCR | 120 | 120 | 120 | 120 | 120 | 120 | 120 | 120 | 120 |
| Plasticizer | Actcol P-23 | 55 | 49.8 | 49.8 | 40 | 40 | 43 | 49 | 49 | 46 |
| Pigment | Tipaque R-820 | 20 | 20 | 20 | 20 | 20 | 20 | 20 | 20 | 20 |
| Antisagging agent | Disparlon 6500 | 2 | 2 | 2 | 2 | 2 | 2 | 2 | 2 | 2 |
| Ultraviolet absorber | Tinuvin 327 | 1 | | | | | | | | |
| | Sumisorb 400 | | 1 | 1 | 1 | 1 | 1 | 1 | 1 | 1 |
| Light stabilizer | Sanol LS-770 | 1 | 1 | 1 | 1 | 1 | 1 | 1 | 1 | 1 |
| Dehydrating agent | A-171 | | 2 | 2 | | 2 | 2 | 2 | 2 | 2 |
| Adhesiveness-imparting agent | A-1120 | | 3 | 3 | | 3 | 3 | 3 | 3 | 3 |
| | A-1110 | 5 | | | | | | | | |
| | A-1100 | | | | 6.6 | | | | | |
| | A-187 | 3 | | | | | | | | |
| | KBE-403 | | | | 3.8 | | | | | |

TABLE 3-continued

| Amine compound | Guanidine compound (B) | 1-phenylguanidine solution (I) | 3.4 | | | | | | | | |
|---|---|---|---|---|---|---|---|---|---|---|---|
| | | 1-phenylguanidine solution (II) | | 5.3 | 5.3 | 25 | 25 | 20 | 10 | 10 | 15 |
| | | 1-(o-tolyl)guanidine solution | | | | | | | | | |
| | | 1-(o-tolyl)biguanide | | | | | | | | | |
| | | 1,1,3,3-tetramethyl-guanidine | | | | | | | | | |
| Surface curability | | | 37 minutes | 22 minutes | 35 minutes | 71 minutes | 62 minutes | 58 minutes | 42 minutes | 37 minutes | 30 minutes |
| Depth curability | | | 3.5 mm | 3.9 mm | 4.1 mm | 4.4 mm | 4.5 mm | 3.7 mm | 3.8 mm | 3.8 mm | 3.6 mm |
| Adhesiveness (90-degree hand peel test) | | Anodic oxidation aluminum | A | A | A | A | B | A | A | A | A |
| | | Steel plate | A | A | A | A | A | A | A | A | A |
| | | Stainless steel | A | A | A | A | A | A | A | A | A |
| Water-resistant adhesiveness (90-degree hand peel test) | | Anodic oxidation aluminum | A | A | B | B | B | A | A | A | A |
| | | Steel plate | A | B | A | A | A | A | A | A | A |
| | | Stainless steel | A | B | A | A | B | B | B | B | A |

| | | | Examples | | | | Comparative Examples | | | |
|---|---|---|---|---|---|---|---|---|---|---|
| | | | 15 | 16 | 17 | 18 | 9 | 10 | 11 | 12 |
| Organic polymer (A) | | A-1 | 10 | | | | | | | |
| | | A-2 | | | | | 100 | | | 100 |
| | | A-3 | | | | | | | | |
| | | A-4 | | | | | | | | |
| | | A-5 | | | | | | 100 | | |
| | | A-6 | 90 | 90 | 90 | 100 | | | 100 | |
| | | A-7 | | 10 | | | | | | |
| | | A-8 | | | 10 | | | | | |
| Calcium carbonate | | Hakuenka OCR | 120 | 120 | 120 | 120 | 120 | 120 | 120 | 120 |
| Plasticizer | | Actcol P-23 | 46 | 46 | 46 | 45.1 | 55 | 55 | 55 | 55 |
| Pigment | | Tipaque R-820 | 20 | 20 | 20 | 20 | 20 | 20 | 20 | 20 |
| Antisagging agent | | Disparlon 6500 | 2 | 2 | 2 | 2 | 2 | 2 | 2 | 2 |
| Ultraviolet absorber | | Tinuvin 327 | | | | | 1 | 1 | 1 | |
| | | Sumisorb 400 | 1 | 1 | 1 | 1 | | | | 1 |
| Light stabilizer | | Sanol LS-770 | 1 | 1 | 1 | 1 | 1 | 1 | 1 | 1 |
| Dehydrating agent | | A-171 | 2 | 2 | 2 | 2 | | | 2 | |
| Adhesiveness-imparting agent | | A-1120 | 3 | 3 | 3 | 3 | | | 3 | |
| | | A-1110 | | | | | 5 | 5 | | 5 |
| | | A-1100 | | | | | | | | |
| | | A-187 | | | | | 3 | 3 | | 3 |
| | | KBE-403 | | | | | | | | |
| Amine compound | Guanidine compound (B) | 1-phenylguanidine solution (I) | | | | | | | | |
| | | 1-phenylguanidine solution (II) | 15 | 15 | 15 | | | | | |
| | | 1-(o-tolyl)guanidine solution | | | | 16.5 | | | | |
| | | 1-(o-tolyl)biguanide | | | | | 4 | 10 | 10 | |
| | | 1,1,3,3-tetramethyl-guanidine | | | | | | | | 9 |
| Surface curability | | | 48 minutes | 44 minutes | 41 minutes | 68 mintues | 55 minutes | 15 hours | 6 hours | 112 minutes |
| Depth curability | | | 3.5 mm | 3.9 mm | 4.3 mm | 4.4 mm | 3.2 mm | 1.9 mm | 1.0 mm | 3.6 mm |
| Adhesiveness (90-degree hand peel test) | | Anodic oxidation aluminum | A | A | A | A | A | B | A | A |
| | | Steel plate | A | A | A | A | A | C | A | A |
| | | Stainless steel | A | A | A | A | A | A | A | A |
| Water-resistant adhesiveness (90-degree hand peel test) | | Anodic oxidation aluminum | A | A | A | A | B | C | A | C |
| | | Steel plate | A | A | A | A | A | B | A | C |
| | | Stainless steel | A | B | B | B | A | C | A | C |

As is evident from Table 3, surface curing was rapid, depth curing was extensive, and adhesiveness was also good in Examples 6 to 18 in which 1-phenylguanidine or 1-(o-tolyl)guanidine was used as the silanol condensation catalyst. On the contrary, in Comparative Examples 9 to 11 in which 1-(o-tolyl)biguanide was used, surface curing was slow and depth curing was also less extensive. In Comparative Example 12 in which 1,1,3,3-tetramethylguanidine was used, surface curing was slow and water-resistant adhesiveness was poor.

Example 19

The methyldimethoxysilyl group-terminated polypropylene oxide (A-5) obtained in Synthesis Example 5 (100 parts by weight), 120 parts by weight of surface treated colloidal calcium carbonate (product of Shiraishi Kogyo, trade name; Hakuenka CCR), 46 parts by weight of a polypropylene glycol type plasticizer with a molecular weight of 3000 (product of Mitsui Takeda Chemicals, trade name: Actcol P-23), 20 parts by weight of white pigment titanium oxide (product of Ishihara Sangyo, trade name: Tipaque R-820), 2 parts by weight of an antisagging agent (product of Kusumoto Chemicals, trade name; Disparlon 6500), 1 part by weight of a benzoate type ultraviolet absorber (product of Sumika Chemtex, trade name: Sumisorb 400) and 1 part by weight of a hindered amine type light stabilizer (product of Sankyo Lifetech, trade name: Sanol LS-770) were weighed and mixed together and, after thorough kneading, the mixture was passed through a three-roll paint mill for dispersion. Thereafter, the mixture was dehydrated at 12° C. for 2 hours under reduced pressure and, after cooling to 50° C. or below, thereto were added 2 parts by weight of vinyltrimethoxysilane (product of Dow Corning Toray; trade name: A-171) as a dehydrating agent, 3 parts by weight of γ-(2-aminoethyl)aminopropyltrimethoxysilane (product of Dow Corning Toray, trade name: A-1120) as a silane coupling agent and 15 parts by weight of the 1-phenylguanidine solution (II) as a silanol condensation catalyst, and the whole mixture was kneaded under substantially anhydrous conditions and then hermetically packed in a moisture-proof container cartridge; a one-pack type curable composition was thus obtained.

Example 20

A one-pack type curable composition was obtained in the same manner as in Example 19 except that 3.8 parts by weight of diisopropoxytitanium bis(ethylacetoacetate) (product of DuPont, trade name: Tyzor DC) was further used.

Example 21

A one-pack type curable composition was obtained in the same manner as in Example 20 except that Tyzor DC was used in an amount of 7.5 parts by weight.

Example 22

A one-pack type curable composition was obtained in the same manner as in Example 19 except that 2.4 parts by weight of diisopropoxyaluminum ethylacetoacetate (product of Wako Pure Chemical Industries) was further used.

Example 23

A one-pack type curable composition was obtained in the same manner as in Example 19 except that 2.9 parts by weight of dodecylbenzenesulfonic acid (soft type) (product of Tokyo Chemical Industry) was further used.

Example 24

A one-pack type curable composition was obtained in the same manner as in Example 19 except that 1.9 parts by weight of neodecanoic acid (product of Japan Epoxy Resins, trade name: Versatic 10) was further used.

(Surface Curability)

Under conditions of 23° C. and 50% RH, each of the above curable compositions was spread to a thickness of about 3 mm with a spatula, and the surface of the curable composition was touched gently with a microspatula from time to time and the time required for the composition to become no more sticking to the microspatula was determined. The results thus obtained are shown in Table 1. In practical use, shorter time for the composition to become no more sticking to the microspatula indicates more rapid curing and more excellent surface curability of the curable composition.

(Cured Product Tensile Characteristics)

A 3-mm-thick sheet-shaped test sample was prepared from each of the above curable compositions, and then, set and cured by allowing the specimen to stand under conditions of 23° C. and 50% RH for 3 days and further at 50° C. for 4 days. No. 3 dumbbell specimens were punched out from the sheet and subjected to tensile testing using a Shimadzu model autograph at a pulling rate of 200 mm/minute, and the 100% tensile modulus, strength at break and elongation at break were measured.

TABLE 4

| | | Examples | | | | | |
| --- | --- | --- | --- | --- | --- | --- | --- |
| | | 19 | 20 | 21 | 22 | 23 | 24 |
| Organic polymer (A) | A-5 | 100 | 100 | 70 | 80 | 90 | 90 |
| Calcium carbonate | Hakuenka CCR | 120 | 120 | 120 | 120 | 120 | 120 |
| Pigment | Tipaque R-820 | 20 | 20 | 20 | 20 | 20 | 20 |
| Plasticizer | Actcol P-23 | 46 | 46 | 46 | 46 | 46 | 46 |
| Antisagging agent | Disparlon 6500 | 2 | 2 | 2 | 2 | 2 | 2 |
| Ultraviolet absorber | Sumisorb 400 | 1 | 1 | 1 | 1 | 1 | 1 |
| Light stabilizer | Sanol LS-770 | 1 | 1 | 1 | 1 | 1 | 1 |
| Dehydrating agent | A-171 | 2 | 2 | 2 | 2 | 2 | 2 |
| Adhesiveness-imparting agent | A-1120 | 3 | 3 | 3 | 3 | 3 | 3 |
| Guanidine compound (B) | 1-phenylguanidine solution (II) | 15 | 15 | 15 | 15 | 15 | 15 |
| Titanium compound | Tyzor DC | | 3.8 | 7.5 | | | |
| Aluminum compound | Diisopropoxyaluminum ethylacetoacetate | | | | 2.4 | | |
| Sulfonic acid | Dodecylbenzenesulfonic acid (soft type) | | | | | 2.9 | |
| Carboxylic acid | Versatic 10 | | | | | | 1.9 |
| Surface curability | | 67 minutes | 34 minutes | 24 minutes | 43 minutes | 44 minutes | 52 minutes |
| Cured product tensile strength | 100% modulus | 0.62 MPa | 0.57 MPa | 0.67 MPa | 0.71 MPa | 0.65 MPa | 0.62 MPa |
| | Strength at break | 1.69 MPa | 1.96 MPa | 2.54 MPa | 1.31 MPa | 2.08 MPa | 1.86 MPa |
| | Elongation at break | 601% | 678% | 725% | 362% | 594% | 585% |

As is evident from Table 4, practical surface curing was observed in Example 19 in which 1-phenylguanidine was used as the silanol condensation catalyst; further rapid surface curing and large tensile strength and elongation of the cured products were observed in Examples 20 and 21 in which Tyzor DC was used in combination. Further rapid surface curing was also observed in Examples 22 to 24 in which diisopropoxyaluminum ethylacetoacetate, dodecylbenzenesulfonic acid (soft type) or Versatic 10 was respectively used in combination.

The invention claimed is:

1. A curable composition which comprises:
   an organic polymer (A) containing a silicon-containing group capable of crosslinking under siloxane bond formation; and
   a guanidine compound (B-1), as a silanol condensation catalyst (B), represented by the general formula (3):

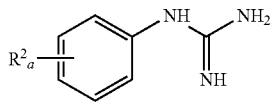

(3)

wherein the a R²s each independently is a hydrogen atom, a halogen atom, a hydroxyl group, an amino group, a nitro group, a cyano group, a sulfonic acid group, or an organic group; and a is an integer of 0 to 5.

2. The curable composition according to claim 1, wherein the guanidine compound (B-1) is 1-phenylguanidine and/or 1-(o-tolyl)guanidine.

3. The curable composition according to claim 1, wherein the main chain skeleton of the organic polymer (A) comprises at least one selected from among a hydrogen atom, a carbon atom, a nitrogen atom, an oxygen atom and a sulfur atom.

4. The curable composition according to claim 1, wherein the main chain skeleton of the organic polymer (A) comprises at least one selected from the group consisting of polyoxyalkylene polymers, saturated hydrocarbon polymers and (meth)acrylate ester polymers.

5. The curable composition according to claim 4, wherein the polyoxyalkylene polymer is a polyoxypropylene polymer.

6. The curable composition according to claim 1, which contains the guanidine compound (B-1) in an amount of 0.001 to 20 parts by weight per 100 parts by weight of the organic polymer (A).

7. The curable composition according to claim 1, which contains an organic acid as the component (C) in an amount of 0.001 to 20 parts by weight per 100 parts by weight of the organic polymer (A).

8. The curable composition according to claim 1, which contains a titanium compound and/or an aluminum compound as the component (D) in an amount of 0.001 to 20 parts by weight per 100 parts by weight of the organic polymer (A).

9. A sealant which comprises the curable composition according to claim 1.

10. An adhesive which comprises the curable composition according to claim 1.

* * * * *